US010853268B2

(12) United States Patent
Imazaki et al.

(10) Patent No.: US 10,853,268 B2
(45) Date of Patent: Dec. 1, 2020

(54) PARITY GENERATING INFORMATION PROCESSING SYSTEM

(71) Applicant: HITACHI, LTD., Tokyo (JP)

(72) Inventors: Miho Imazaki, Tokyo (JP); Akira Yamamoto, Tokyo (JP); Tomohiro Yoshihara, Tokyo (JP); Kohei Tatara, Tokyo (JP)

(73) Assignee: HITACHI, LTD., Tokyo (JP)

(*) Notice: Subject to any disclaimer, the term of this patent is extended or adjusted under 35 U.S.C. 154(b) by 0 days.

(21) Appl. No.: 16/081,876

(22) PCT Filed: Jun. 15, 2016

(86) PCT No.: PCT/JP2016/067718
§ 371 (c)(1),
(2) Date: Aug. 31, 2018

(87) PCT Pub. No.: WO2017/216887
PCT Pub. Date: Dec. 21, 2017

(65) Prior Publication Data
US 2019/0012270 A1 Jan. 10, 2019

(51) Int. Cl.
*G06F 12/126* (2016.01)
*G06F 12/0871* (2016.01)
(Continued)

(52) U.S. Cl.
CPC ........ *G06F 12/126* (2013.01); *G06F 11/1076* (2013.01); *G06F 12/0804* (2013.01);
(Continued)

(58) Field of Classification Search
CPC ............... G06F 12/0804; G06F 12/126; G06F 2212/1032; G06F 2212/3042;
(Continued)

(56) References Cited

U.S. PATENT DOCUMENTS 5,579,474 A * 11/1996 Kakuta ............... G06F 11/1076
714/6.21
5,870,625 A * 2/1999 Chan ..................... G06F 9/3824
710/20
(Continued)

FOREIGN PATENT DOCUMENTS

JP 10-269695 A 10/1998
JP 2009-129201 A 6/2009
(Continued)

OTHER PUBLICATIONS

Natarajan, Ramesh, "RAID 2, RAID 3, RAID 4, RAID 6 Explained with Diagram", Nov. 21, 2011, hosted by The Geek Stuff, <https://www.thegeekstuff.com/2011/11/raid2-raid3-raid4-raid6/>(Year: 2011).*
(Continued)

*Primary Examiner* — Reginald G Bragdon
*Assistant Examiner* — Aaron D Ho
(74) *Attorney, Agent, or Firm* — Baker Botts L.L.P.

(57) ABSTRACT

An information processing system including a processor, a memory, and a plurality of drives, wherein when a write request of new data is received, the processor stores the new data in the memory, transmits a response for the write request to a transmission source of the write request, reads old data updated by the new data from a first drive of the plurality of drives and old parity related to the old data from a second drive of the plurality of drives according to transmission of the response, store the old data and the old parity in the memory, generates new parity related to the new data from the new data, the old data, and the old parity stored in the memory, and stores the new data in the first drive to store the new parity in the second drive.

9 Claims, 23 Drawing Sheets

(51) Int. Cl.
    *G06F 11/10*         (2006.01)
    *G06F 12/0804*     (2016.01)
    *G06F 12/0875*     (2016.01)

(52) U.S. Cl.
    CPC ...... *G06F 12/0871* (2013.01); *G06F 12/0875* (2013.01); *G06F 2211/1019* (2013.01); *G06F 2212/1032* (2013.01); *G06F 2212/261* (2013.01); *G06F 2212/3042* (2013.01)

(58) Field of Classification Search
    CPC ..... G06F 2211/1009; G06F 2211/1019; G06F 2211/1028; G06F 2211/1035; G06F 2211/104; G06F 2211/1047; G06F 2211/105; G06F 2211/1092; G06F 12/0871; G06F 12/0875; G06F 2212/261; G06F 11/076
    USPC ......................................................... 711/133
    See application file for complete search history.

(56) References Cited

U.S. PATENT DOCUMENTS

| | | | | |
|---|---|---|---|---|
| 6,012,123 | A * | 1/2000 | Pecone | G06F 11/1076 |
| | | | | 711/111 |
| 6,243,795 | B1 | 6/2001 | Yang et al. | |
| 6,370,611 | B1 * | 4/2002 | Callison | G06F 11/108 |
| | | | | 710/35 |
| 7,188,219 | B2 * | 3/2007 | Jeddeloh | G06F 13/1642 |
| | | | | 710/310 |
| 7,231,497 | B2 * | 6/2007 | Trika | G06F 12/0804 |
| | | | | 711/129 |
| 7,788,453 | B2 * | 8/2010 | Boyd | G06F 11/2069 |
| | | | | 711/144 |
| 8,285,931 | B2 * | 10/2012 | Ledford | G06F 12/0802 |
| | | | | 711/114 |
| 2004/0133741 | A1 * | 7/2004 | Kuwata | G06F 11/1076 |
| | | | | 711/113 |
| 2007/0028045 | A1 * | 2/2007 | Hung | G06F 3/0613 |
| | | | | 711/114 |
| 2009/0138672 | A1 | 5/2009 | Katsuragi et al. | |
| 2009/0235114 | A1 * | 9/2009 | Igashira | G06F 11/1076 |
| | | | | 714/6.12 |
| 2010/0125677 | A1 * | 5/2010 | Bouvier | G06F 12/0888 |
| | | | | 710/5 |
| 2011/0153954 | A1 | 6/2011 | Seki et al. | |
| 2015/0324294 | A1 | 11/2015 | Ogawa et al. | |
| 2015/0339058 | A1 | 11/2015 | Yoshii et al. | |
| 2017/0286114 | A1 * | 10/2017 | Herdrich | G06F 9/30043 |

FOREIGN PATENT DOCUMENTS

| | | |
|---|---|---|
| JP | 2016-503927 A | 2/2016 |
| WO | WO 00/08563 A1 | 2/2000 |
| WO | WO 2014/155525 A1 | 10/2014 |

OTHER PUBLICATIONS

International Search Report, dated Sep. 20, 2016, which issued during the prosecution of International Application No. PCT/JP2016/067718, which corresponds to the present application.
Office Action, dated Oct. 23, 2019, which issued during the prosecution of Japanese Application No. 2018-523089, which corresponds to the present application (English translation attached).

* cited by examiner

[FIG. 1]
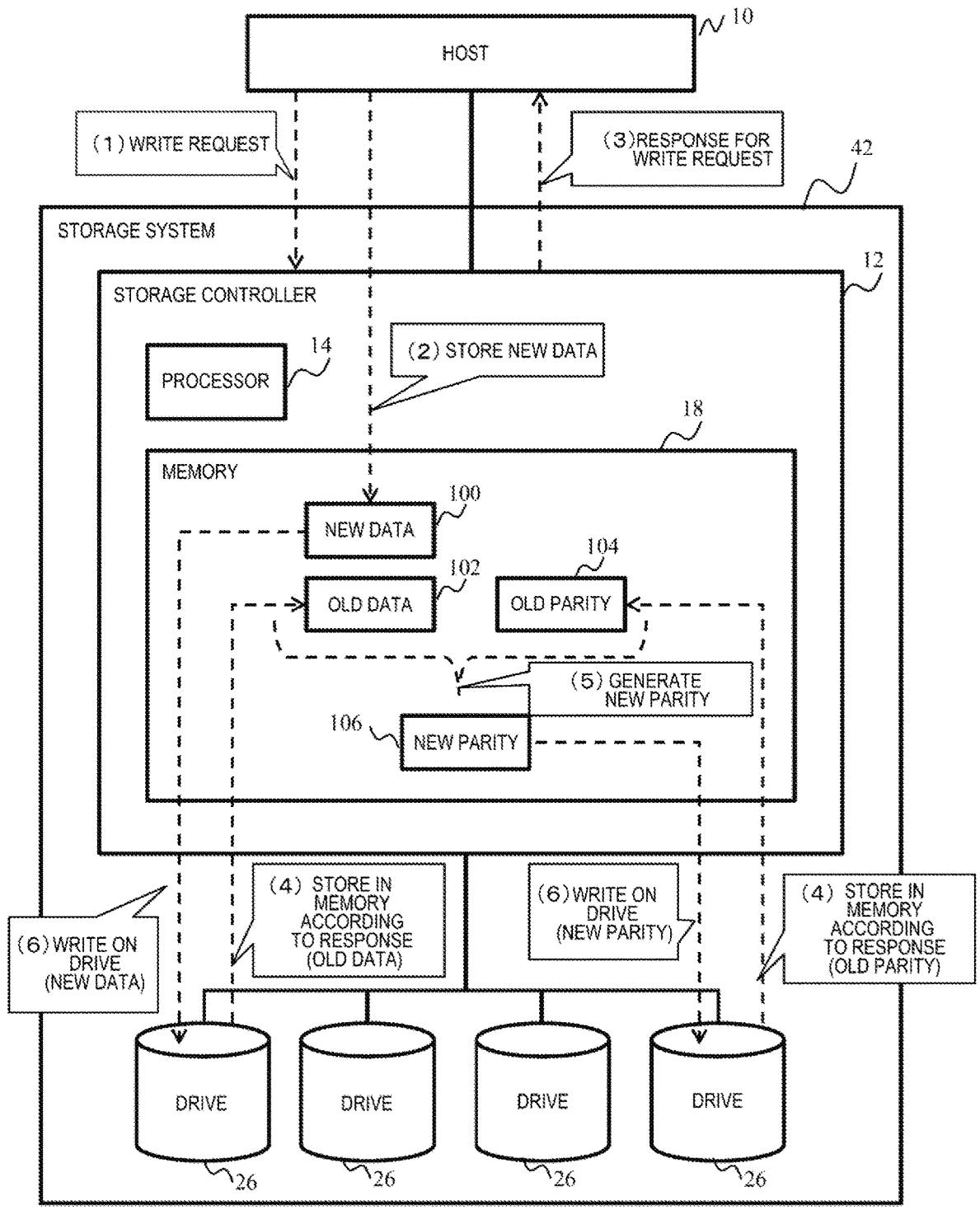

[FIG. 2]
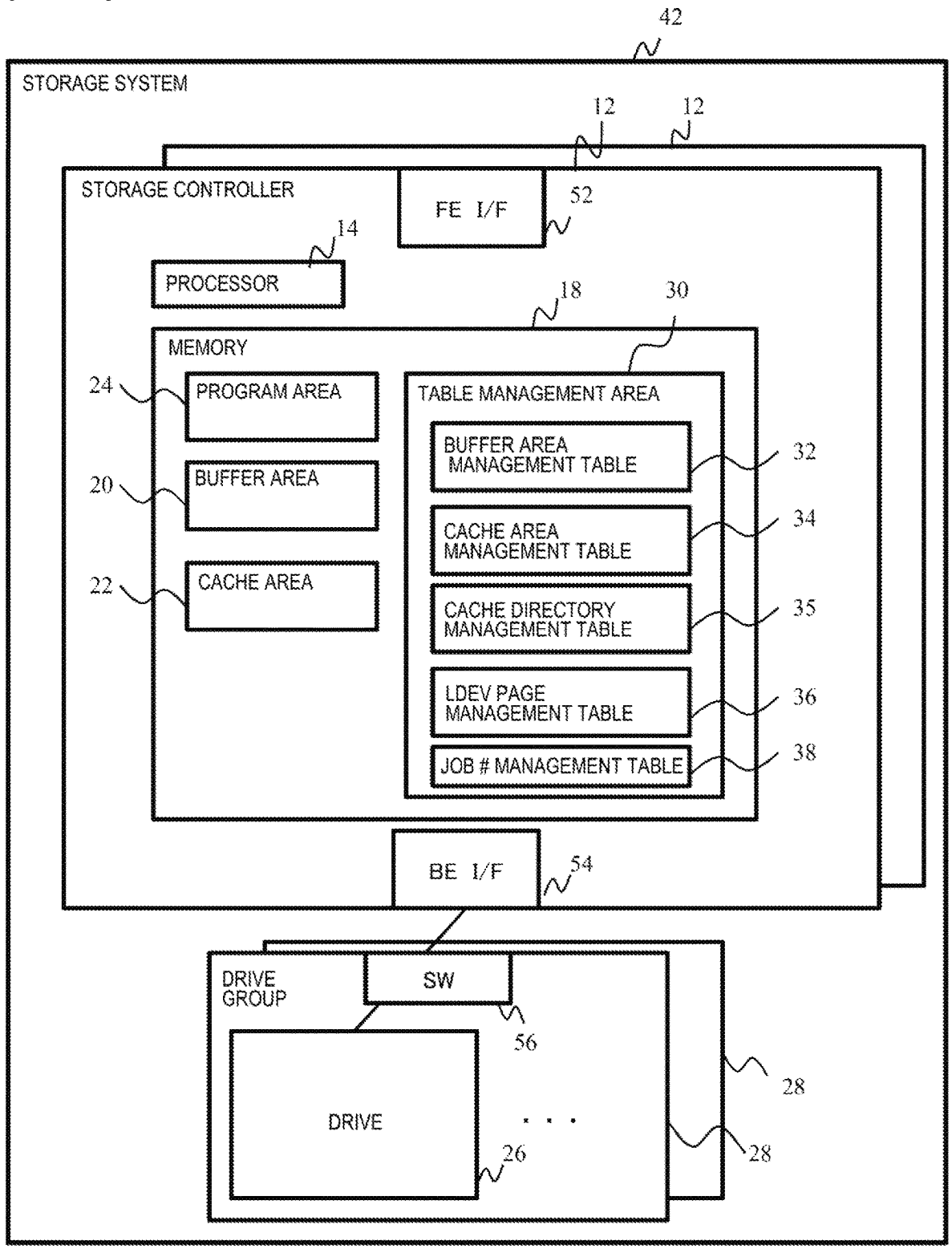

[FIG. 3]

LDEV PAGE MANAGEMENT TABLE 36

| LDEV # | BLOCK # | SUB-BLOCK # | HEAD ADDRESS# | DRIVE TYPE | FLAG DURING Write PROCESS |
|---|---|---|---|---|---|
| 0 | 0 | 00 | 0x0000 | SSD | ON |
| | | 01 | 0x0010 | | OFF |
| | | : | : | | : |
| | 1 | 10 | 0x0300 | SSD | OFF |
| | | 11 | 0x0310 | | ON |
| | | : | : | | : |
| : | | | | | |

[FIG. 4]
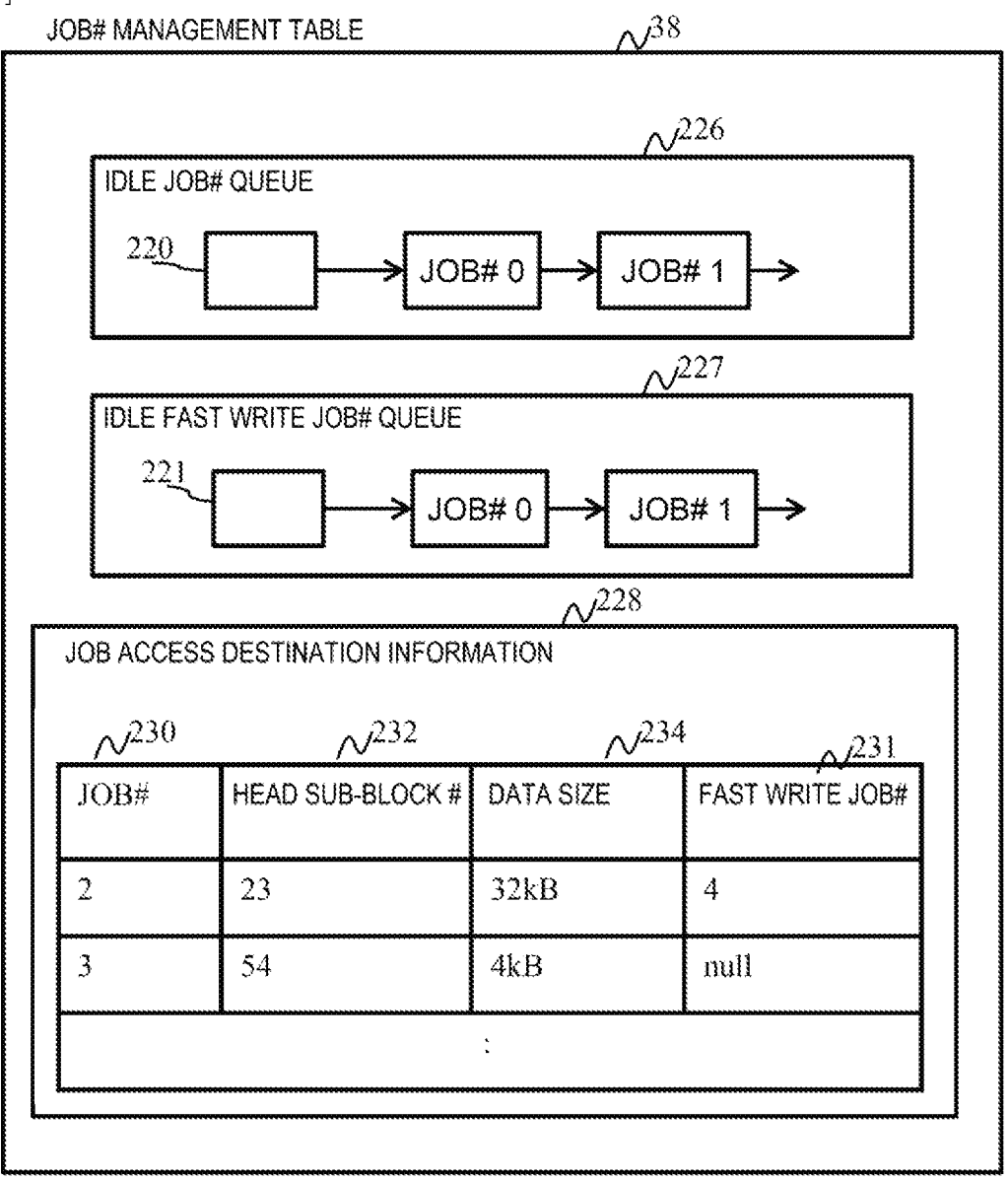

[FIG. 5]
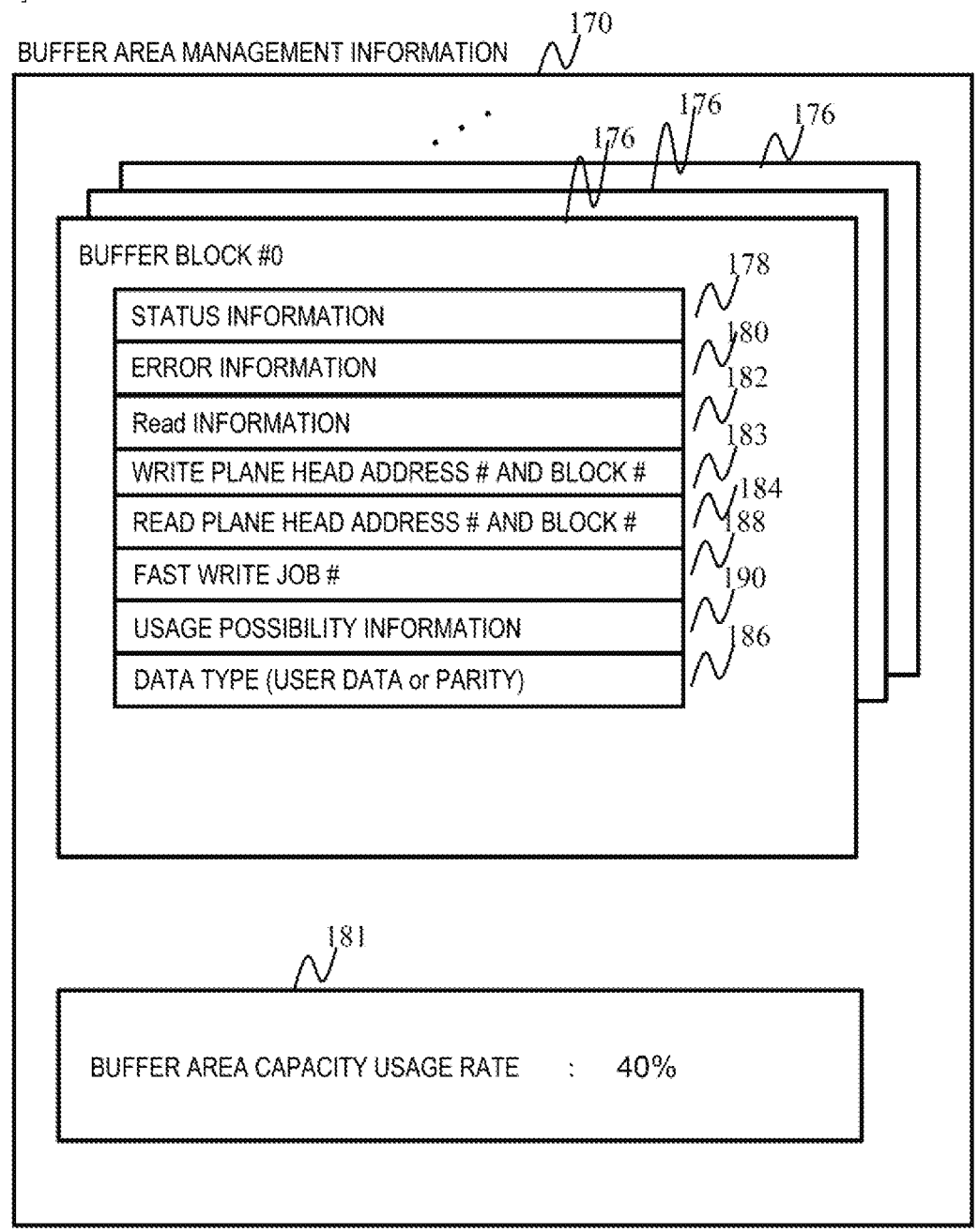

[FIG. 6]
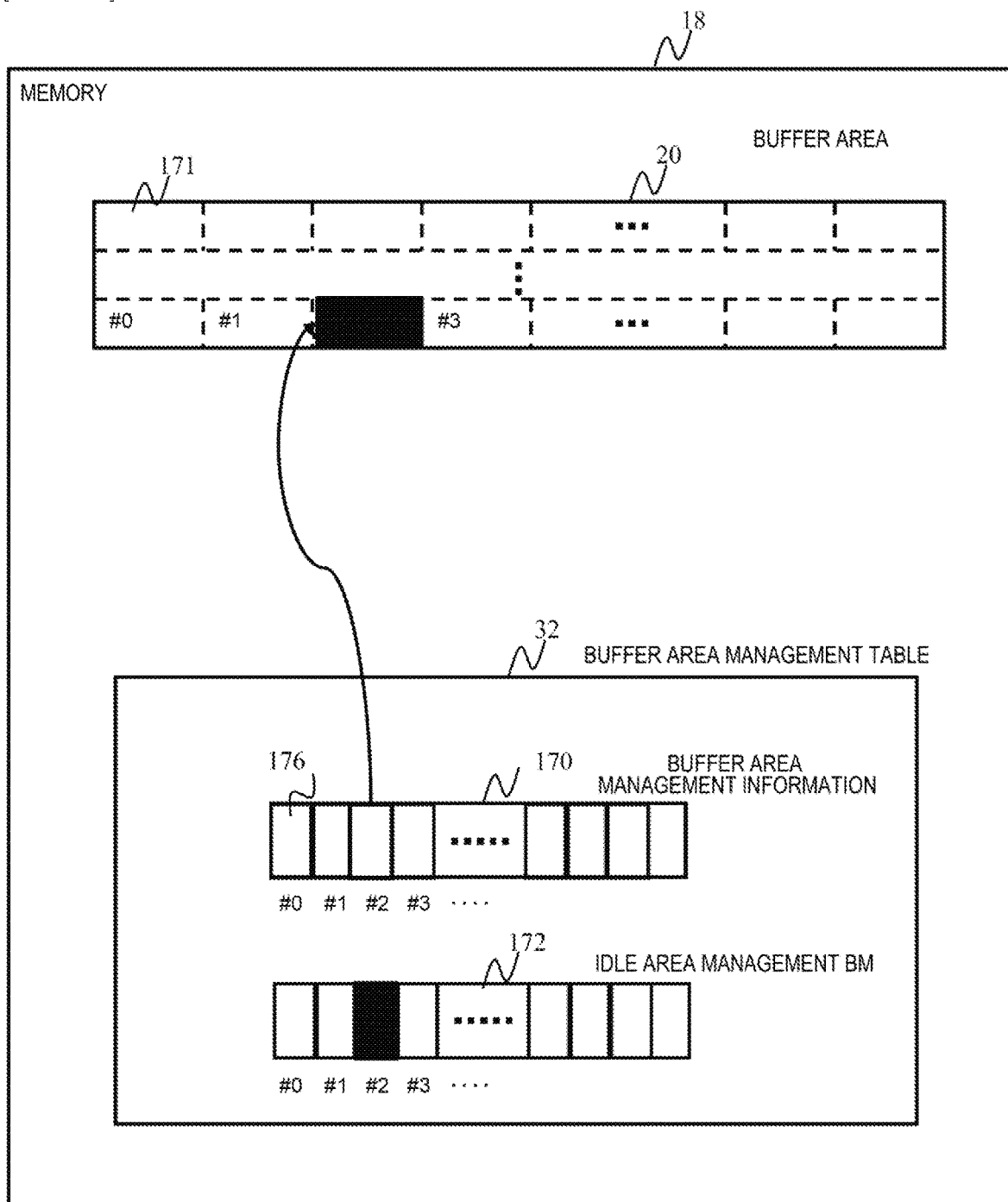

[FIG. 7]
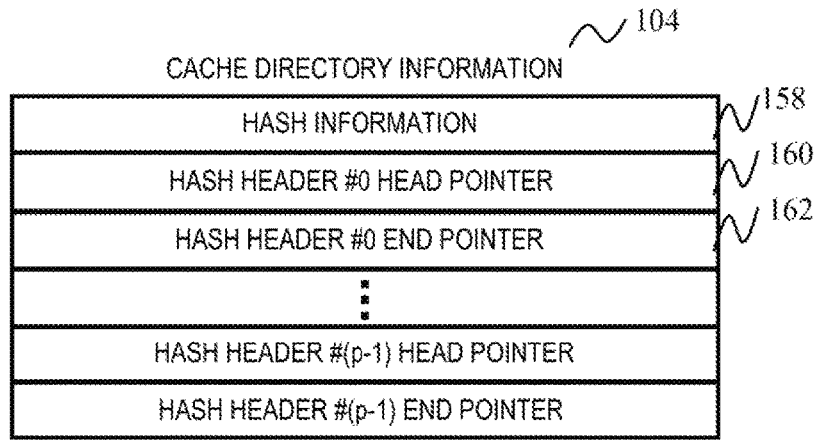
[FIG. 8]
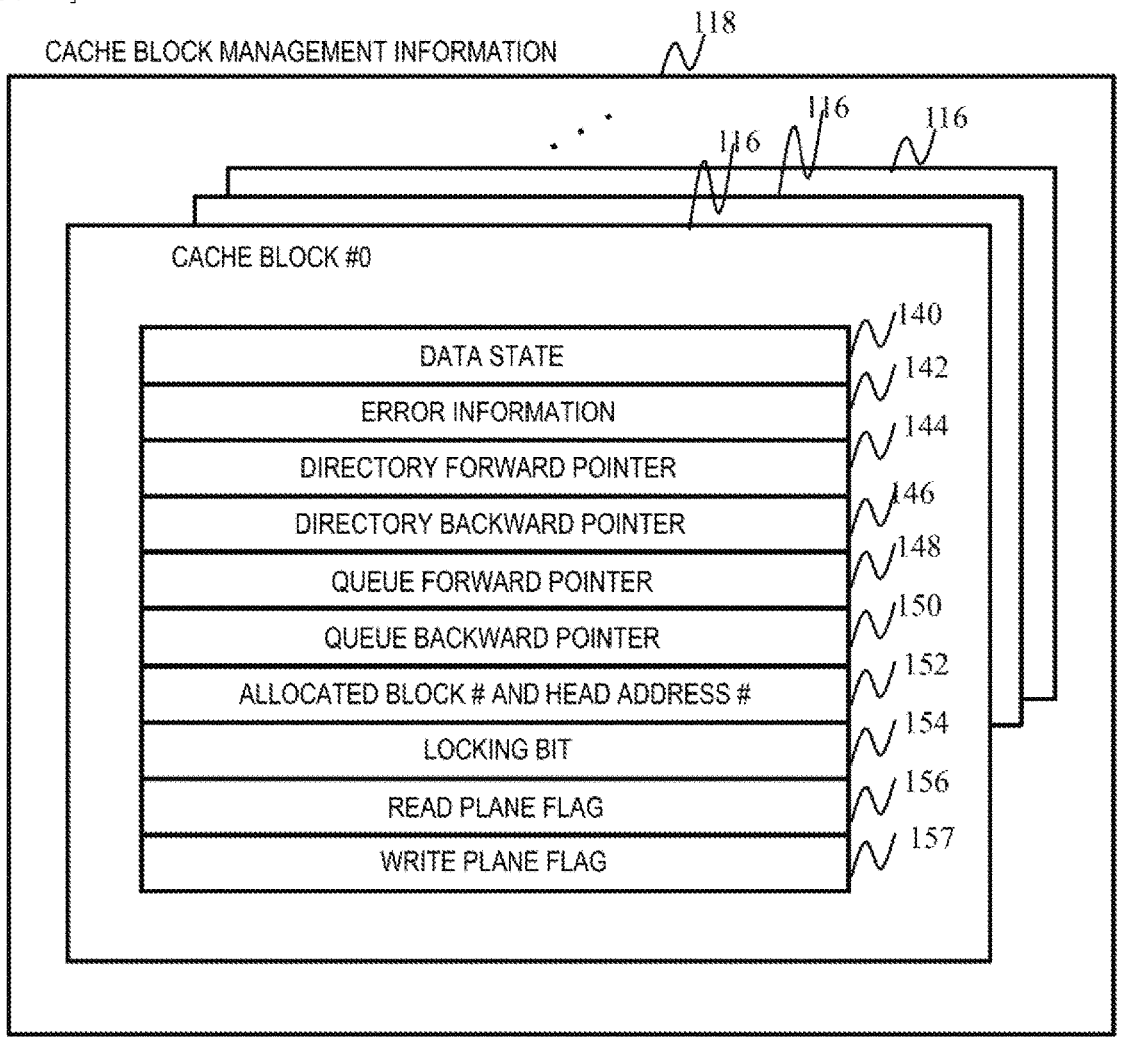

[FIG. 9]
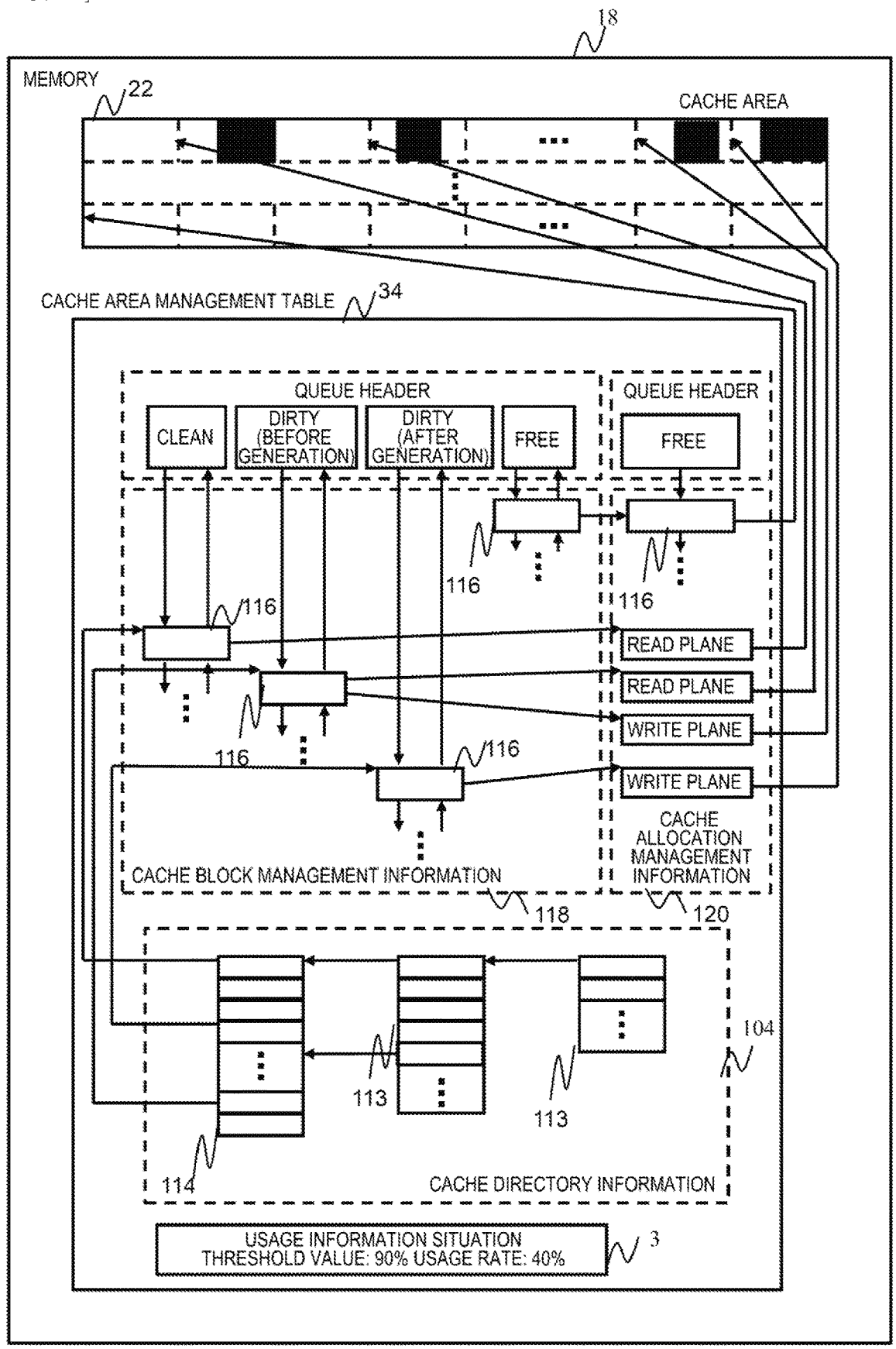

[FIG. 10]
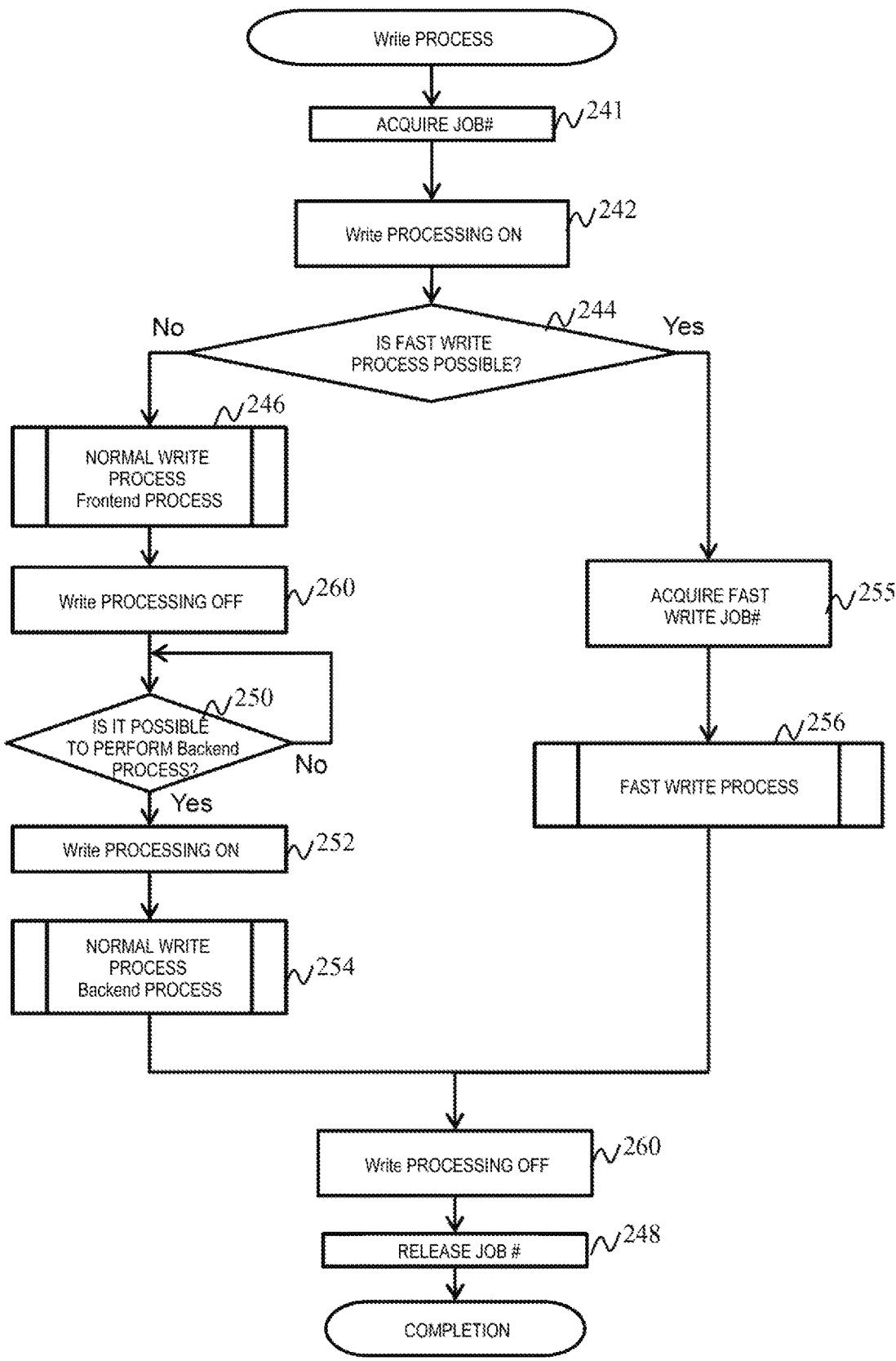

[FIG. 11]
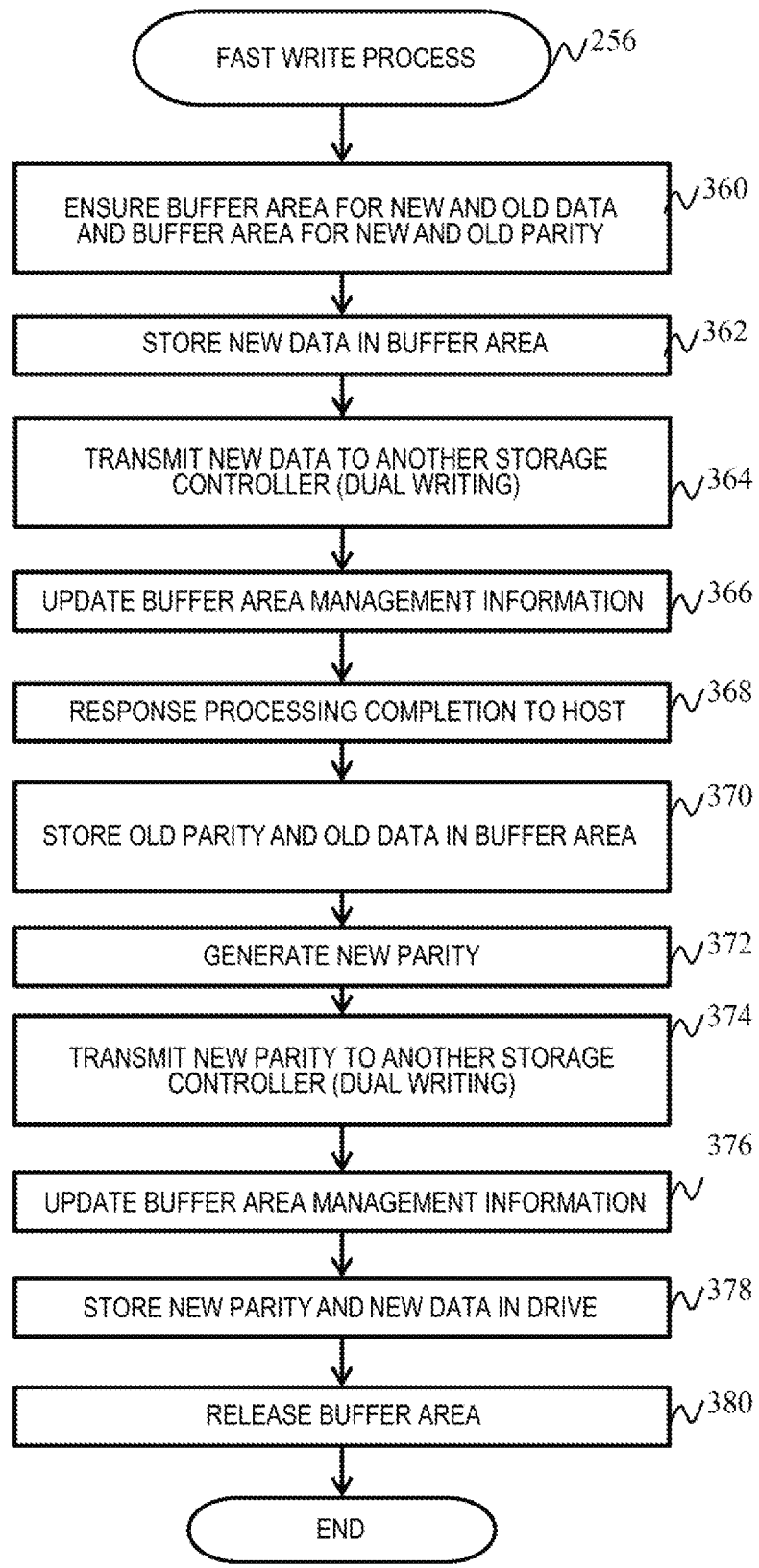

[FIG. 12]
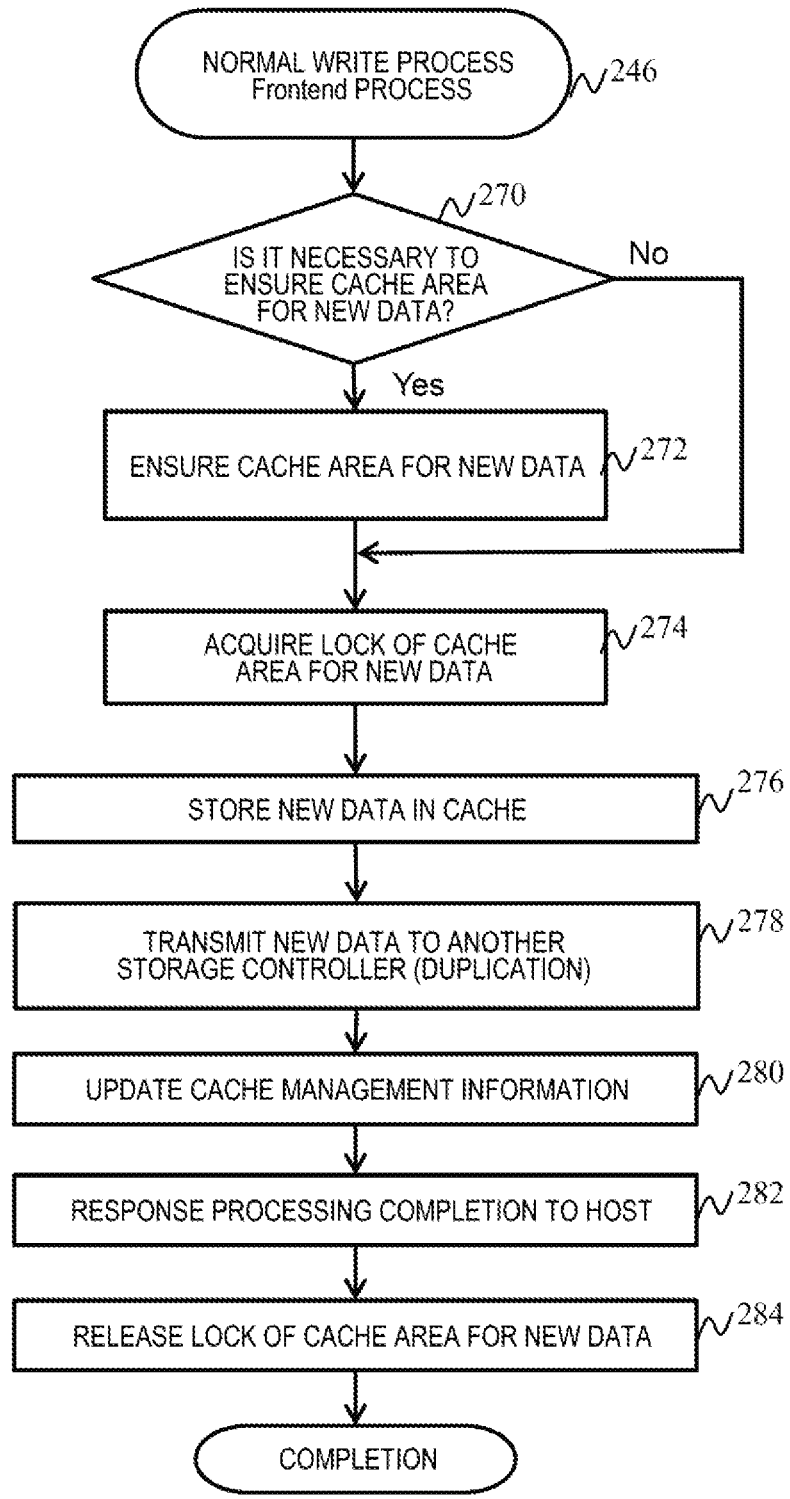

[FIG. 13]
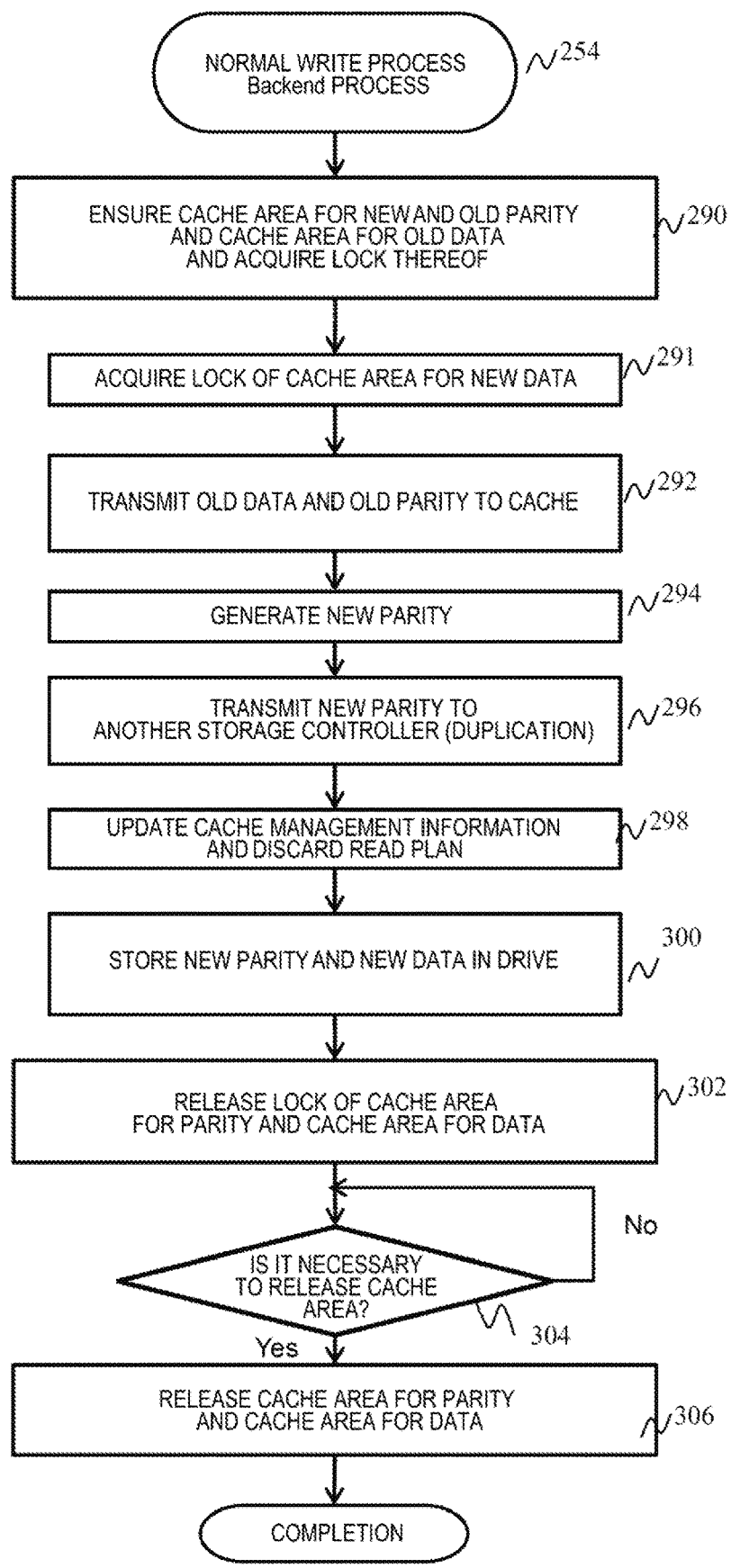

[FIG. 14]
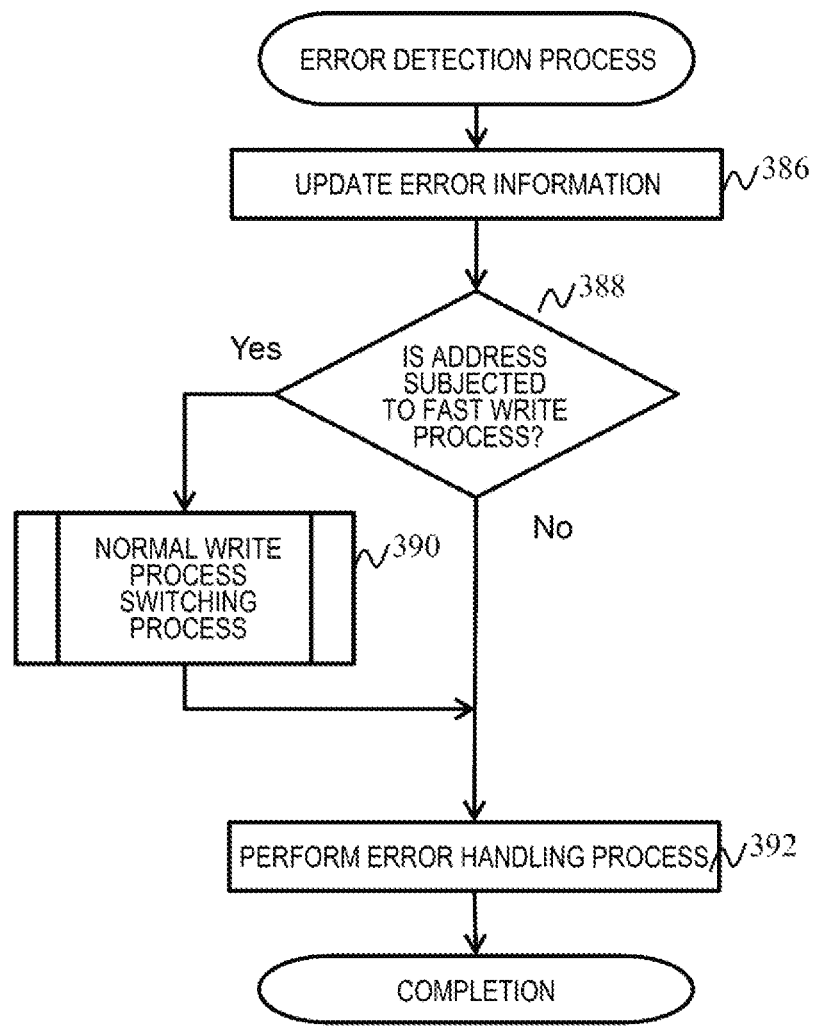

[FIG. 15]
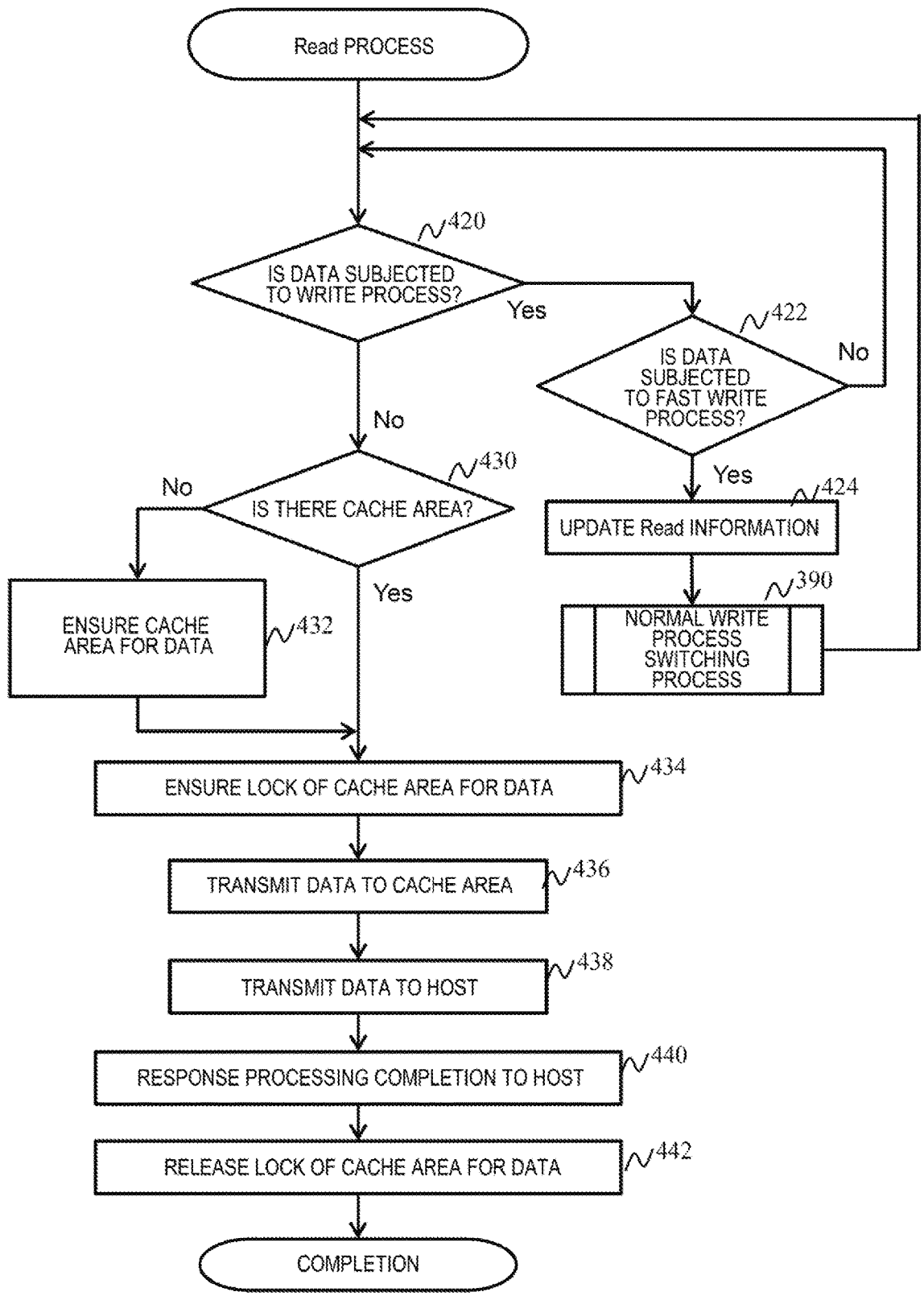

[FIG. 16]
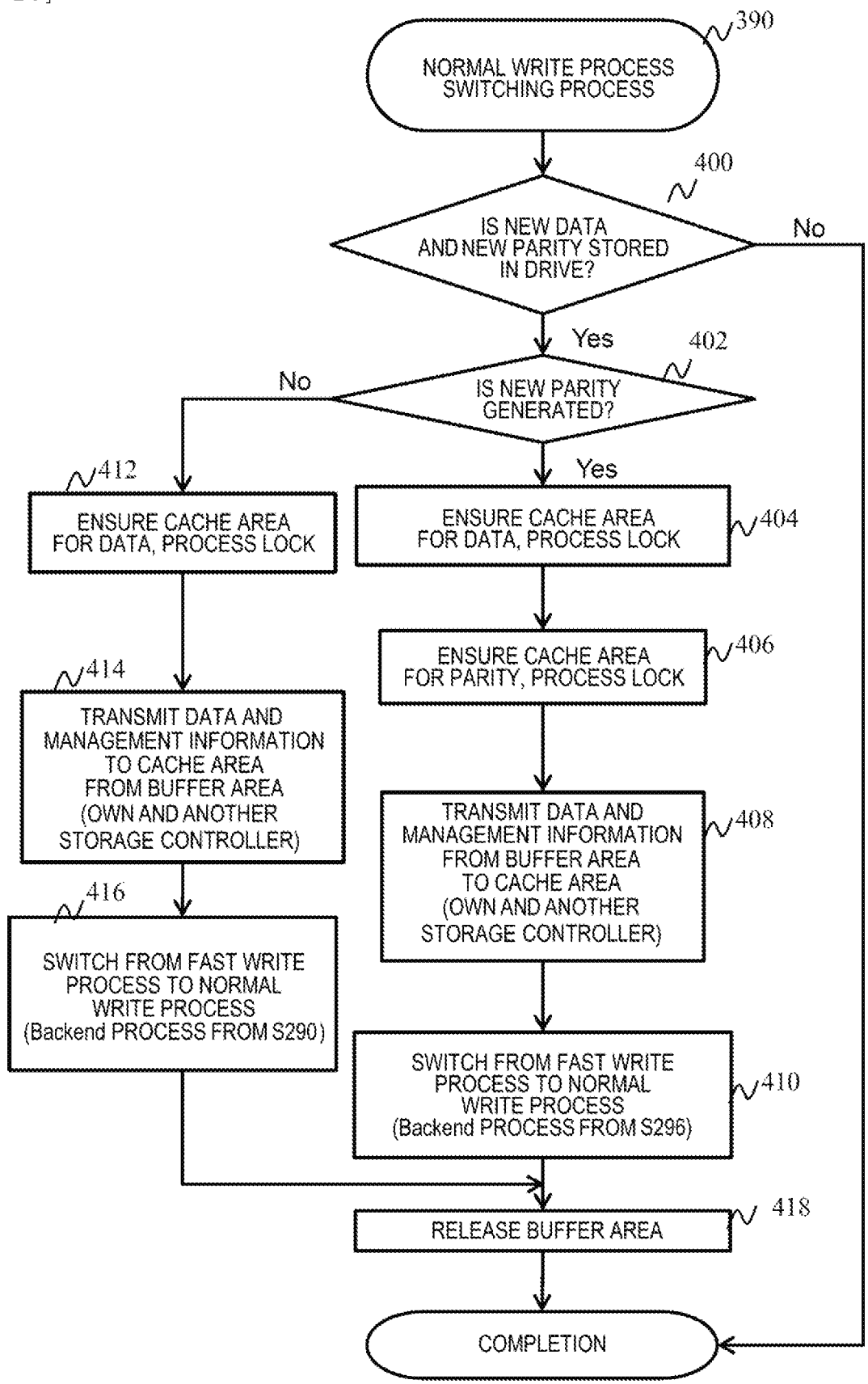

[FIG. 17]
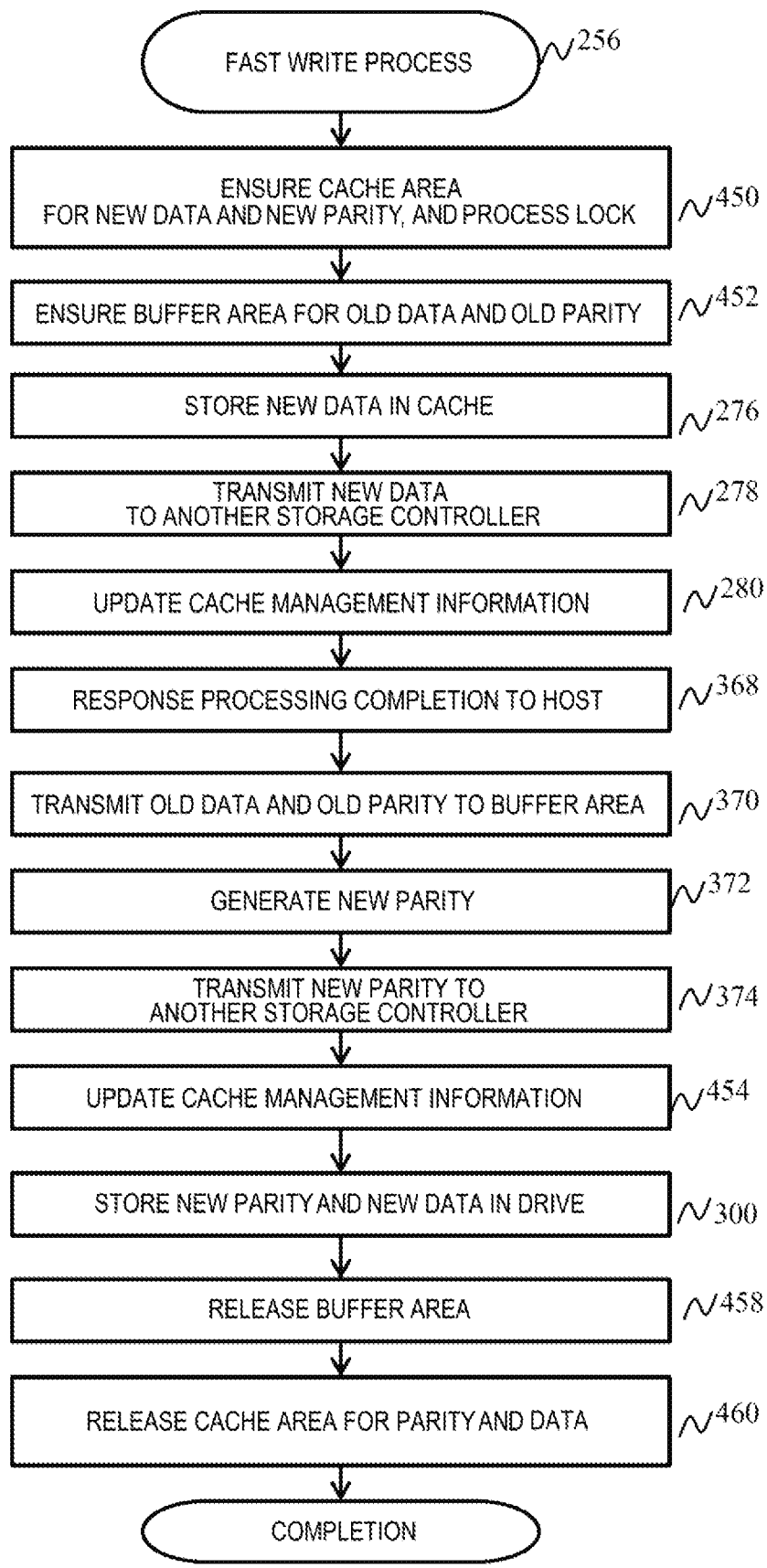

[FIG. 18]
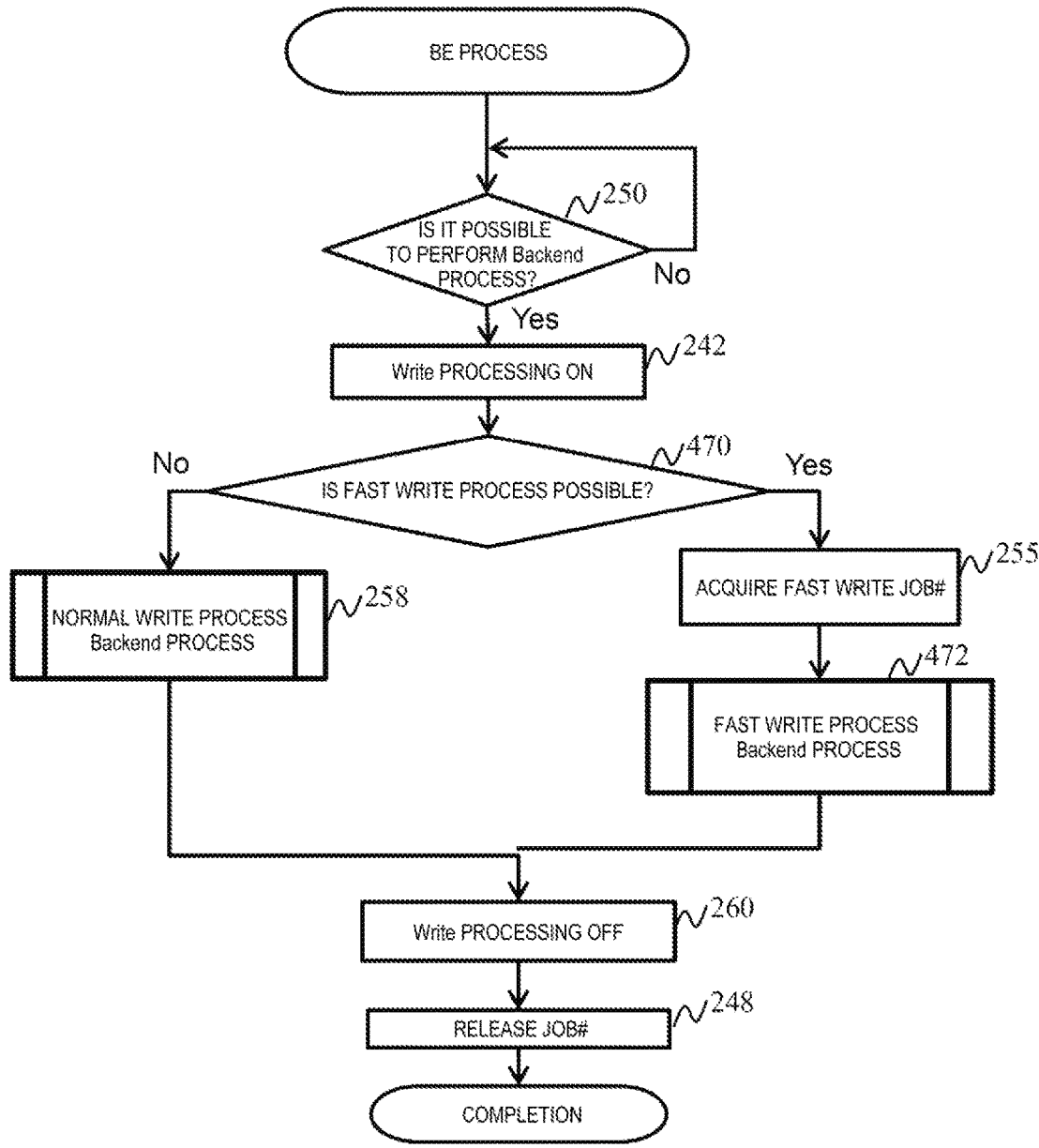

[FIG. 19]
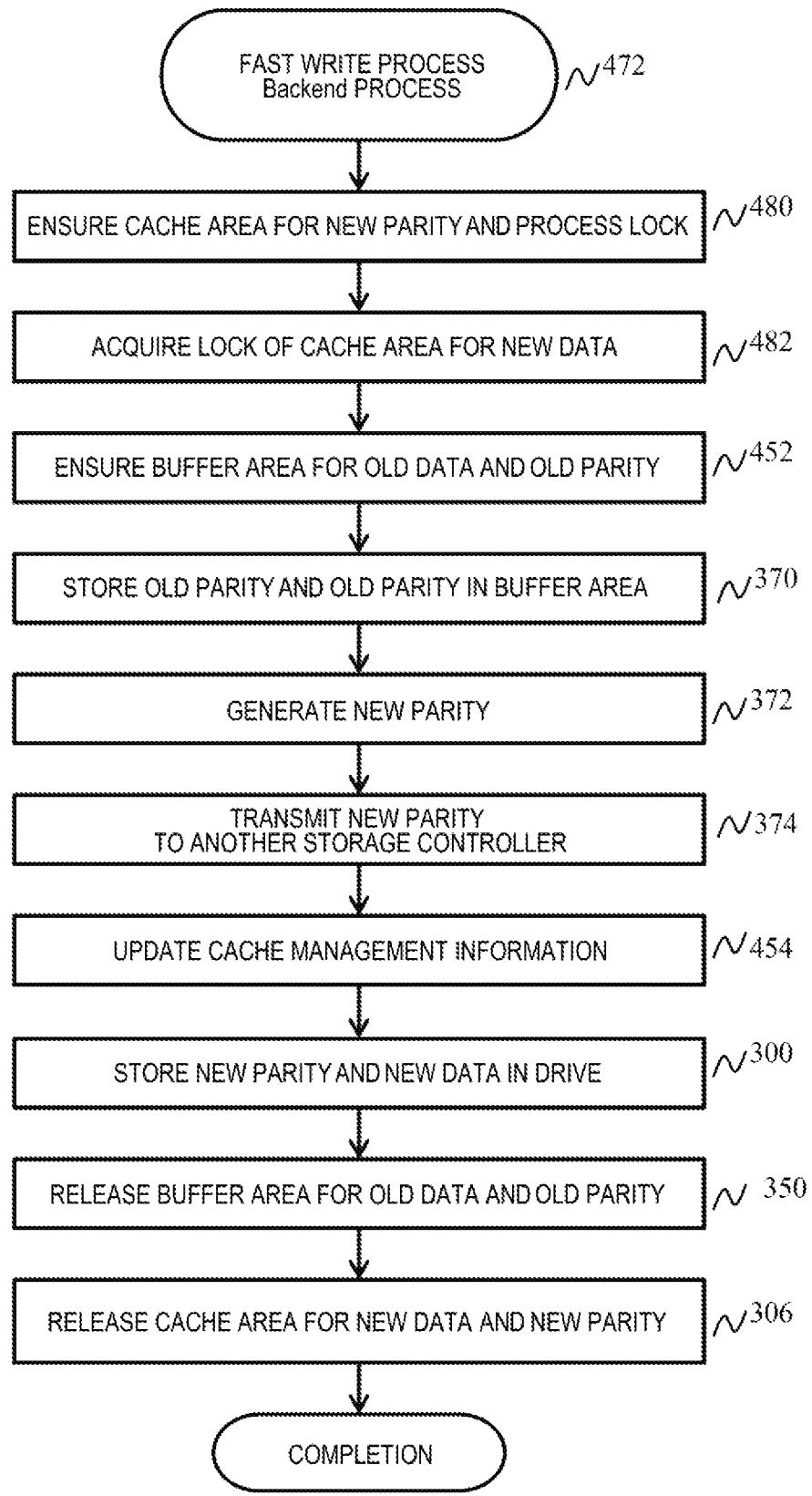

[FIG. 20]
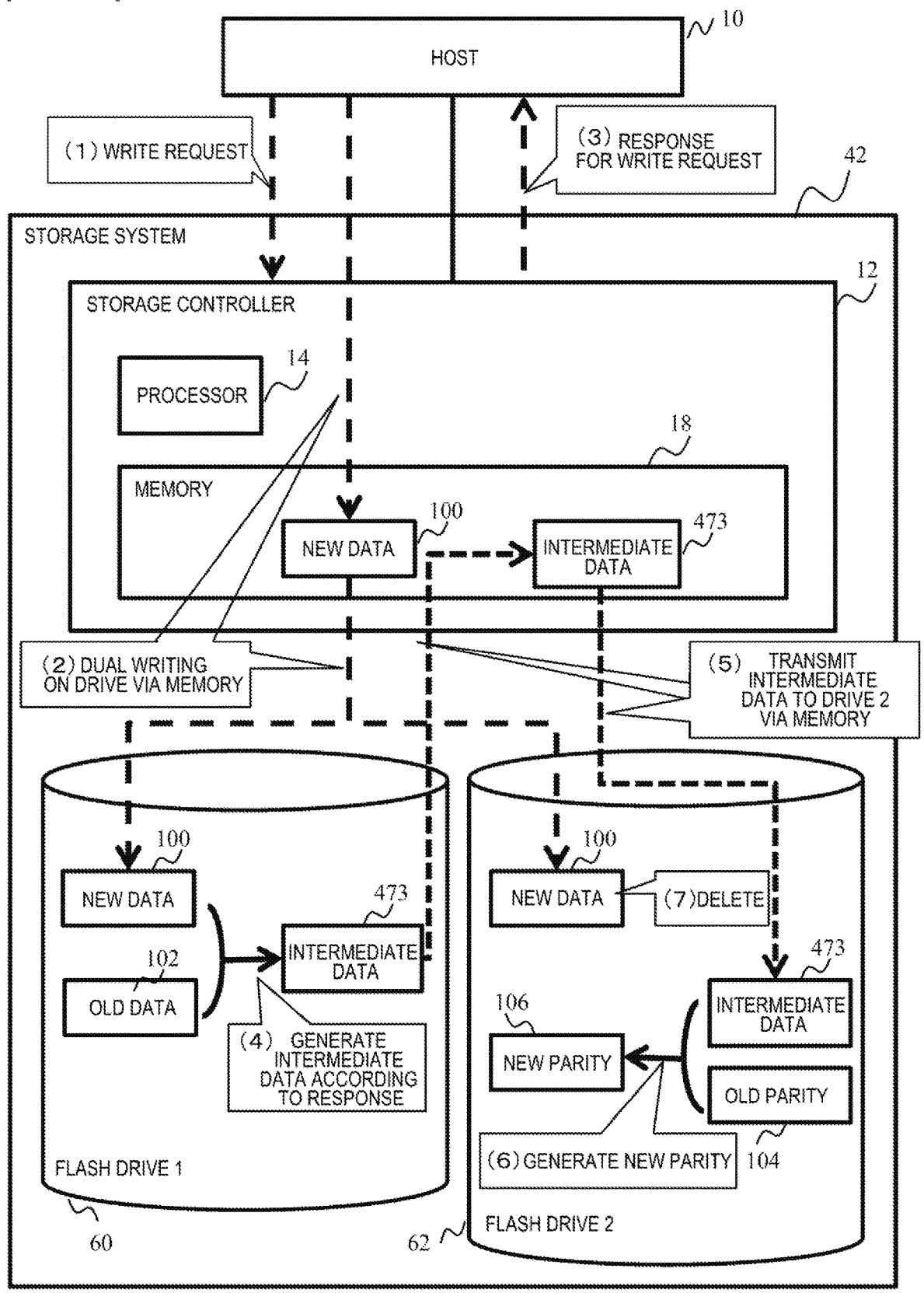

[FIG. 21]
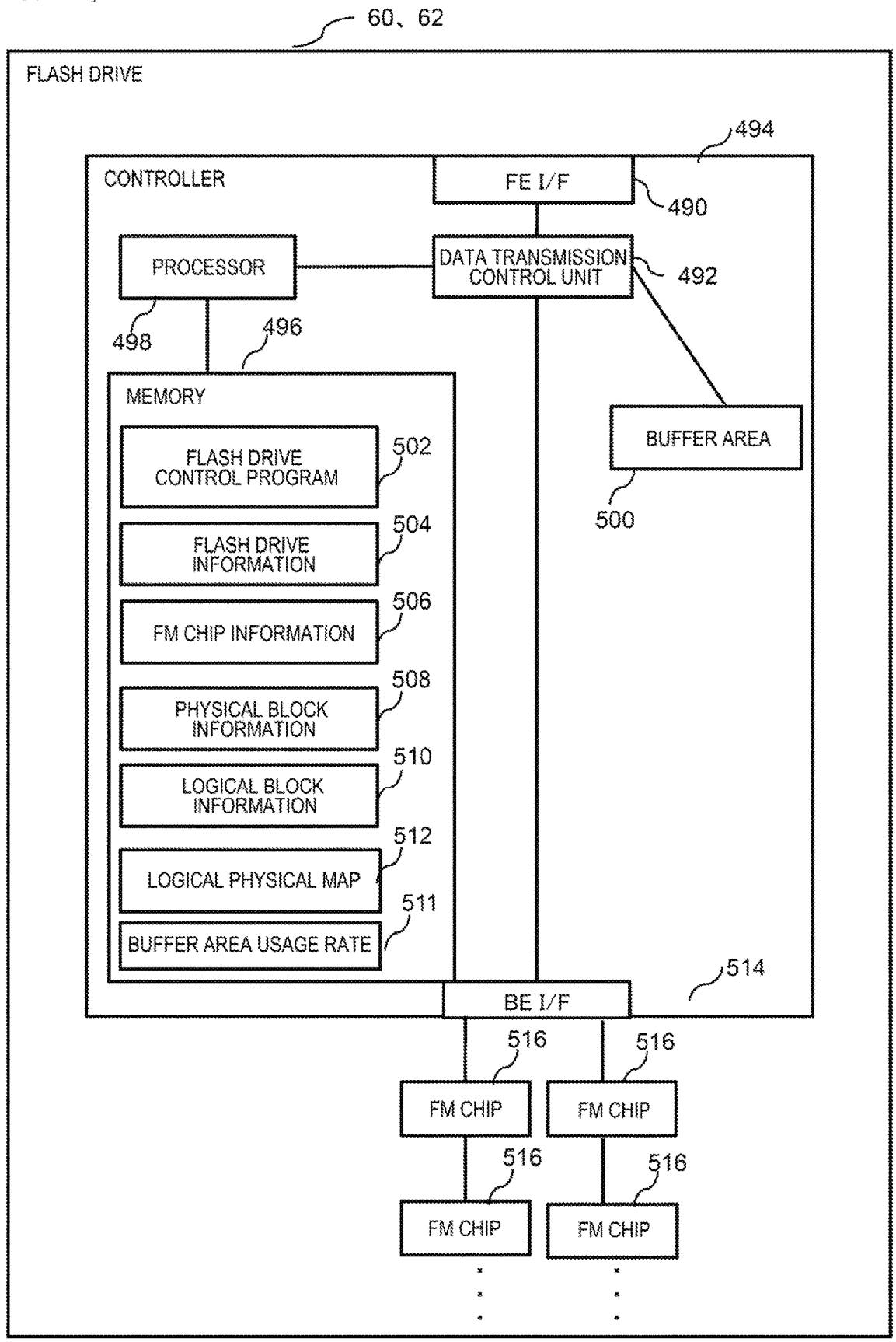

[FIG. 22]
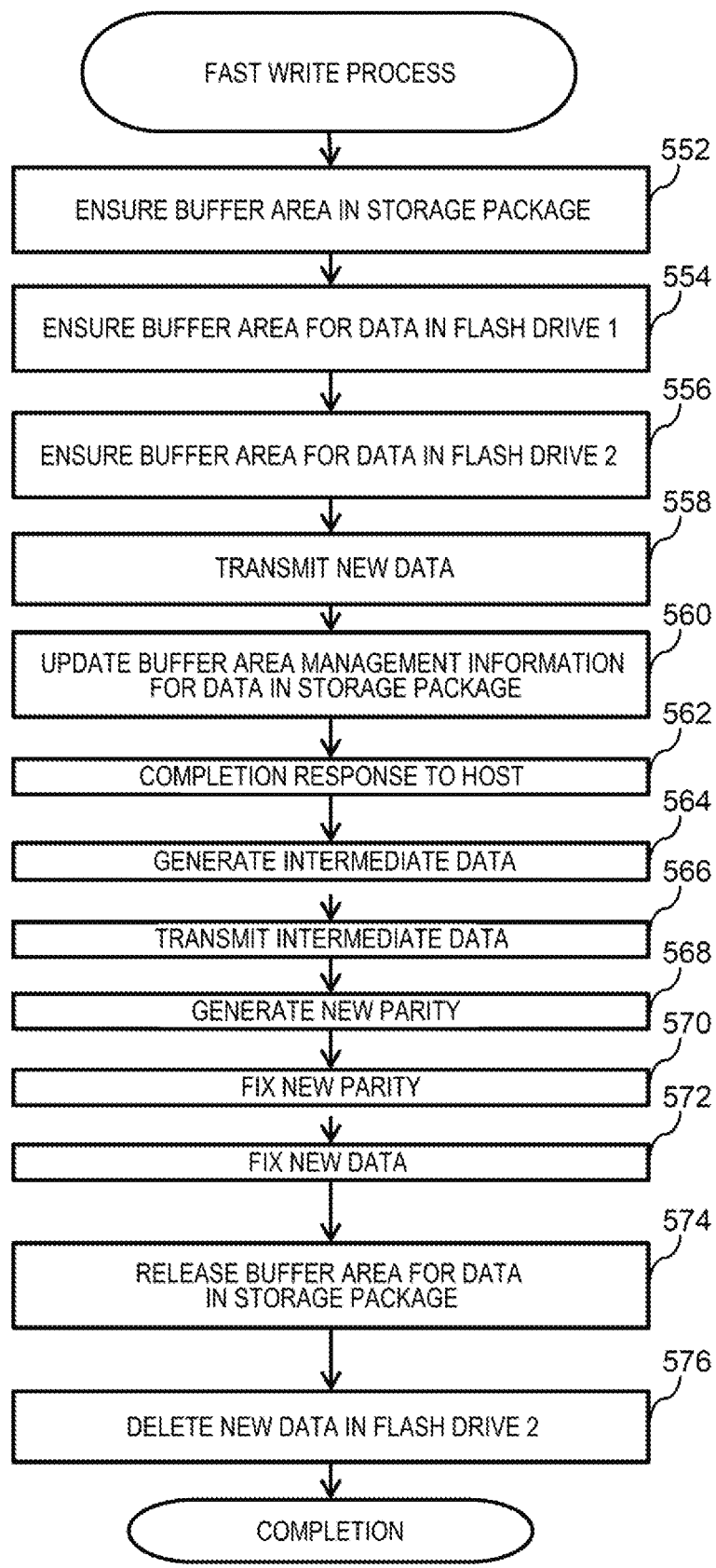

[FIG. 23]
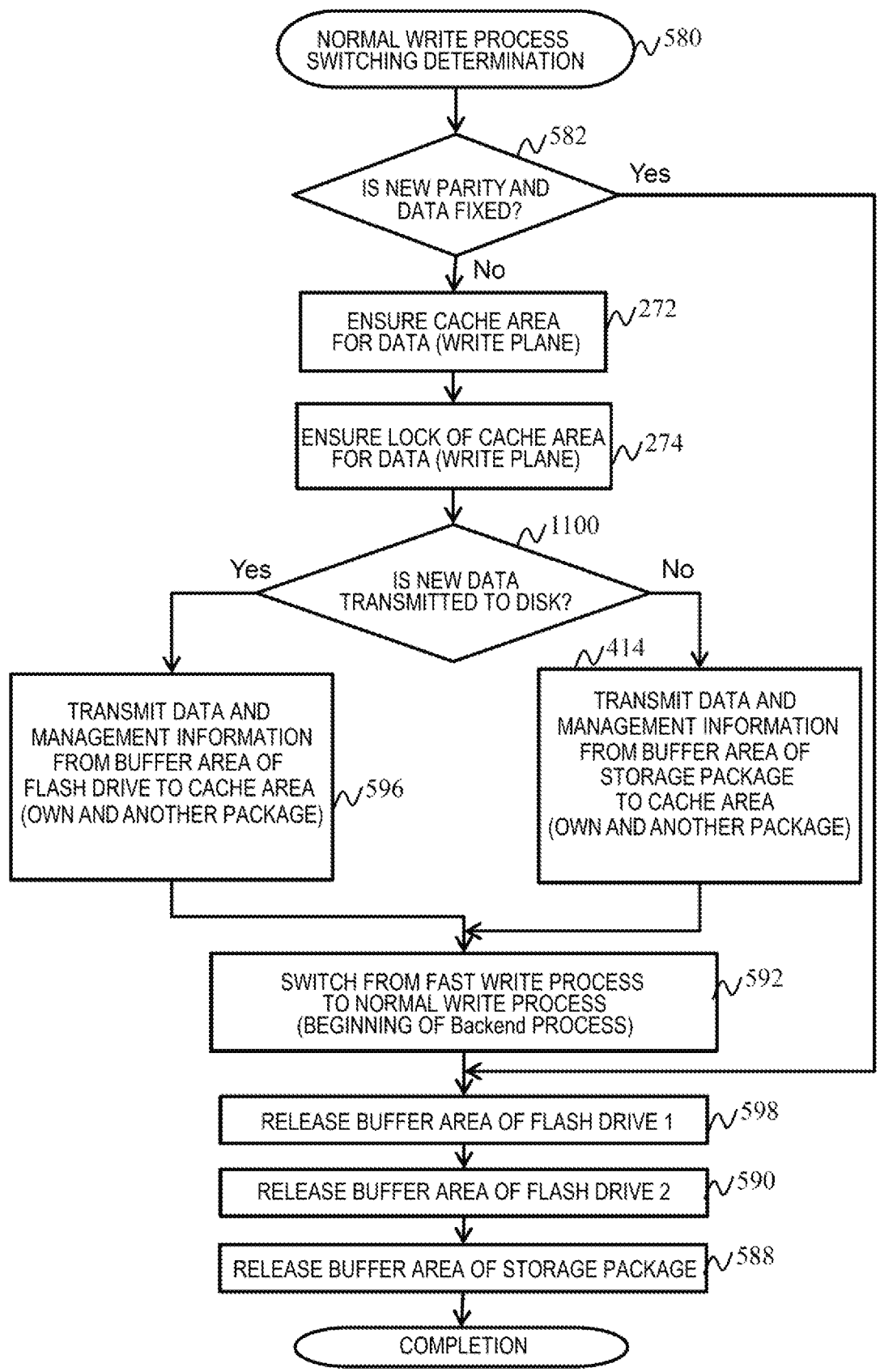

[FIG. 24]
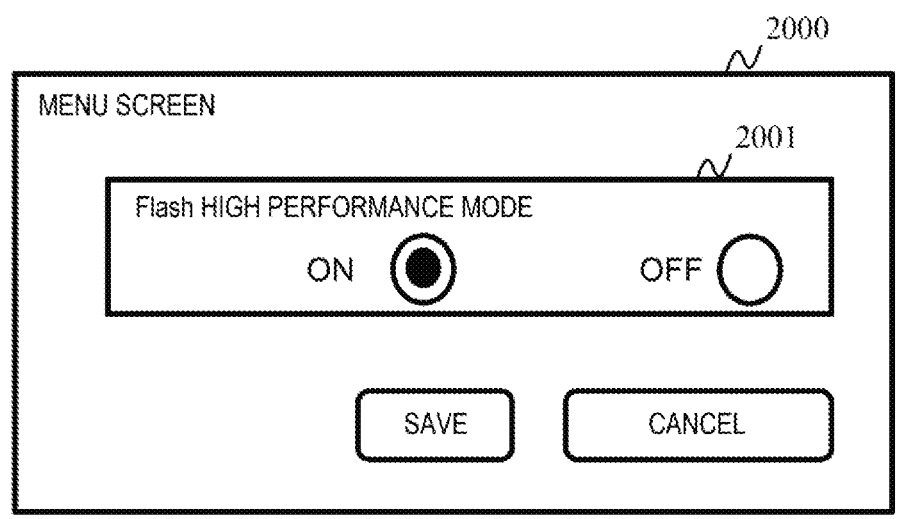
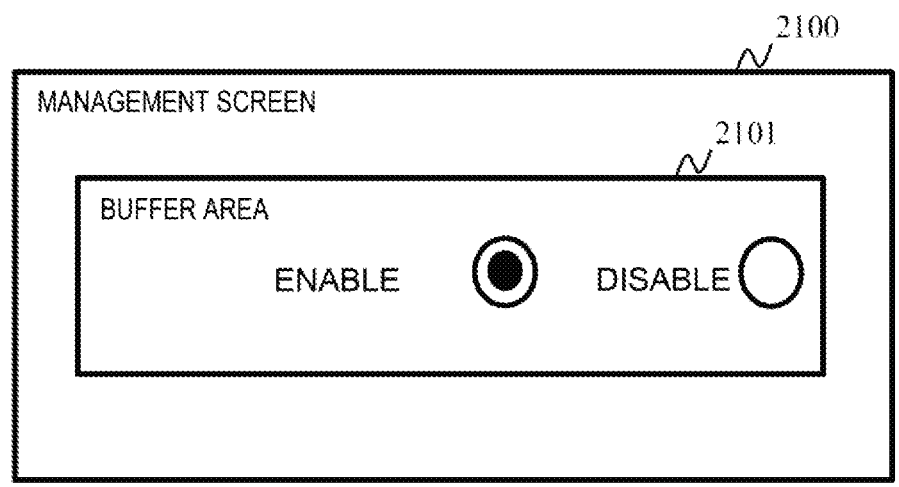

PARITY GENERATING INFORMATION PROCESSING SYSTEM

CROSS REFERENCE TO PRIOR APPLICATIONS

This application is a U.S. National Phase application under 35 U.S.C. § 371 of International Application No. PCT/JP2016/067718, filed on Jun. 15, 2016. The International Application was published in Japanese on Dec. 21, 2017 as WO 2017/216887 A1 under PCT Article 21(2). The contents of the above application are hereby incorporated by reference.

TECHNICAL FIELD

The present invention relates to an information processing system that speeds up write performance.

BACKGROUND ART

Recently, there is increasing employment of a solid-state drive (SSD) that uses, as a storage medium, a NAND type flash memory capable of accessing at a high speed a memory device of a storage device as a database (DB) that accumulates large quantity of data to be subjected to an online transaction process (OLTP) used in Internet banking or electric commerce. In the OLTP process, it is necessary to read/write the large quantity of data at a high speed in real time. The SSD can be accessed at a high speed as compared with a hard disk drive (HDD), and is installed as the memory device of the storage device, so that it is possible to speed up the storage device.

Patent Literature 1 discloses a technology for speeding up a write process by using a dynamic random access memory (DRAM) which can be accessed at a high speed as a cache memory, as a speeding-up technology of a storage device that applies redundant data such as parity to user data and stores the user data in the HDD.

CITATION LIST

Patent Literature

PTL 1: US2011/0153954

SUMMARY OF INVENTION

Technical Problem

Patent Literature 1 discloses the following technology as a technology for speeding up a write process by using a DRAM as a cache memory.

Before data (hereinafter, referred to as new data) requested to be written from a host is stored in the HDD, the new data is stored in the cache memory, and after the new data is stored in the cache memory, a response for the write request is returned to the host. Then, the new data not stored in the HDD is found from the cache memory at a timing asynchronous with the write request from the host, parity related to the new data is generated, and the new data and the generated parity are stored in the HDD.

In the case where the response for the request and the parity generation process are asynchronously performed, when the process up to the host response after the reception of the write request and the process for generating the parity and storing the data in the HDD are started and ended, since it is necessary to overlappingly perform a process for ensuring or releasing areas of the cache memory required for the respective processes. Therefore, in the process for generating the parity and storing the data in the HDD, there occurs an overhead of cache control such as finding the data not stored in the HDD from the cache memory.

In the HDD, the reduction of processing efficiency of a processor due to the aforementioned overhead of cache control is not problematic, but is conspicuous in a high-speed SSD.

Therefore, an object of the present invention is to reduce an overhead due to cache control and suppress a load of a processor in order to increase the speed of a storage system using a SSD.

Solution to Problem

As an example for solving the aforementioned problem, there is the following configuration.

A system including a processor, a memory, and a plurality of drives, wherein, (1) when a write request of new data is received, (2) the processor stores the new data in the memory, (3) transmits a response for the write request to a transmission source of the write request, (4) reads old data which is updated by the new data from a first drive of the plurality of drives and old parity related to the old data from a second drive of the plurality of drives according to transmission of the response and stores the old data and the old parity in the memory, (5) generates new parity related to the new data from the new data, the old data, and the old parity stored in the memory, (6) stores the new data in the first drive, and stores the new parity in the second drive.

Advantageous Effects of Invention

An overhead due to cache control is reduced and a load of a processor is suppressed, so that the number of I/O requests processible per unit time is increased and it is possible to increase the speed of a storage system.

BRIEF DESCRIPTION OF DRAWINGS

FIG. 1 is a schematic diagram of Embodiment 1.

FIG. 2 is a diagram illustrating an example of a configuration of a storage system of Embodiment 1.

FIG. 3 is a diagram illustrating an example of an LDEV page management table of Embodiment 1.

FIG. 4 is a diagram illustrating an example of a JOB # management table of Embodiment 1.

FIG. 5 is a diagram illustrating an example of buffer management information of Embodiment 1.

FIG. 6 is a diagram illustrating an example of buffer area management of Embodiment 1.

FIG. 7 is a diagram illustrating an example of cache directory information of Embodiment 1.

FIG. 8 is a diagram illustrating an example of cache block management information of Embodiment 1.

FIG. 9 is a diagram illustrating an example of cache memory area management of Embodiment 1.

FIG. 10 is a diagram illustrating an example of a write process flow of Embodiment 1.

FIG. 11 is a diagram illustrating an example of a fast write process flow of Embodiment 1.

FIG. 12 is a diagram illustrating an example of a normal write process Frontend process flow of Embodiment 1.

FIG. 13 is a diagram illustrating an example of a normal write process Backend process flow of Embodiment 1.

FIG. 14 is a diagram illustrating an example of an error detection process flow of Embodiment 1.

FIG. 15 is a diagram illustrating an example of a read process flow of Embodiment 1.

FIG. 16 is a diagram illustrating an example of a normal write switching process flow of Embodiment 1.

FIG. 17 is a diagram illustrating an example of a fast write process flow of Embodiment 2.

FIG. 18 is a diagram illustrating an example of another fast write process flow of Embodiment 2.

FIG. 19 is a diagram illustrating an example of another fast write process flow of Embodiment 2.

FIG. 20 is a schematic diagram of Embodiment 3.

FIG. 21 is a diagram illustrating an example of a configuration of a flash drive of Embodiment 3.

FIG. 22 is a diagram illustrating an example of a fast write process flow of Embodiment 3.

FIG. 23 is a diagram illustrating an example of a normal write switching process flow of Embodiment 3.

FIG. 24 is a diagram illustrating an example of a menu screen and a management screen in Embodiment 1.

DESCRIPTION OF EMBODIMENTS

Hereinafter, embodiments will be described.

Embodiment 1

<Overview>

FIG. 1 is a schematic diagram illustrating an overview of the present embodiment. A storage system 42 includes a storage controller 12 having a processor 14 and a memory 18, and a plurality of drives 26, and for example, is connected to a host 10 via a communication network such as a storage area network (SAN).

In the following description, in a write process, the processor 14 generates new parity in response to a write request from the host 10 and stores new data and the new parity in the drives 26, which is called a "fast write process". Hereinafter, the "fast write process", which is performed when the processor 14 of the storage system 42 receives the write request from the host 10, will be described.

(1) When the write request of new data 100 is received from the host 10, (2) the processor 14 stores the new data 100 in a predetermined area of the memory 18, and (3) transmits a response for the write request to the host 10. (4) In response to the transmission of the response to the host 10, the processor 14 reads old data 102 to be updated by the new data 100 and old parity 104 related to old data to the memory 18 from the drives 26 stored with the old data 102 and the old parity 104.

(5) The processor 14 generates new parity 106 related to the new data 100 from the new data 100 and the read old data 102 and old parity 104, (6) and stores the new data 100 and the new parity 106 in the drives 26 stored with the old data 102 and the old parity 104. In this way, the fast write process is ended.

In the fast write process of the present embodiment, the processor 14 generates new parity in response to a write request from the host 10 and stores new data and the new parity in the drives 26. According to the fast write process of the present embodiment, in a case where a response for the write request from the host and the parity generation process are asynchronously performed, when a FE process and a BE process are respectively started and ended, it is necessary to overlappingly perform processes for ensuring and releasing areas of a cache memory required for the respective processes. However, in the BE process, an overhead of cache control such as finding data not stored in the HDD is reduced and a load of a processor is suppressed, so that the number of requests from the host processible per unit time is increased and it is possible to increase the speed of the storage system.

For example, in an all flash array (AFA) in which disks to be installed in the storage system 42 are all flash drives, it is possible to process writing of data at a high speed by the fast write process of the present embodiment, so that it is possible to draw out the performance of the flash drive and improve system performance.

Furthermore, in the present embodiment, when the new data 100 is stored in a predetermined area of the memory 18, since it is also possible to transmit a response for a write request to the host 10 before a parity generation process is performed, it is suitable for a database for an OLTP process requiring a quick response.

Thus, according to the present embodiment, it is possible to provide a user with a platform for a high performance database with high capacity.

The above is the overview of the present embodiment. Hereinafter, the present embodiment will be described in detail.

DETAILED DESCRIPTION

Firstly, a problem of a technology, in which a DRAM of the related art is used as a cache memory, will be described. In the technology for increasing the speed of a write process by using the DRAM as the cache memory, caching is described in addition to asynchronous execution of a response for a request and a parity generation process. The caching is a technology in which data high frequently accessed by a host is read from a HDD and is stored in the cache memory, and when there is an input/output (I/O) request from the host, if data related to the request has been stored in the cache memory, it is possible to increase a processing speed as compared with a case of direct accessing to the HDD. Therefore, firstly, a processor searches for whether the data related to the request has been stored in the cache memory.

However, there is a problem that an overhead of the processor occurs due to the control of the cache memory for increasing the speed of the write process.

The overhead, for example, indicates management of data stored in the cache memory. In order to manage the data, it is necessary to create and update more management information for finding the data. Furthermore, when parity related to new data is generated, in order to read data required for the generation from the HDD and store the data in the cache memory, it is also necessary to create or update management information with respect to the data required for the generation. In addition, a process, in which in order to store data in the HDD from the cache memory at a timing asynchronous with a response for a request, when the data is stored in the HDD, data not stored in the HDD is found based on more management information, is also an overhead.

In this regard, in the present embodiment, a description will be provided for a configuration for reducing an overhead due to the aforementioned cache control and suppressing a load of a processor.

FIG. 2 is a diagram illustrating an example of a configuration of a storage system of the present embodiment. In the storage system of FIG. 2, by way of example, it is possible to increase processing speed by storing data in the cache memory.

The storage system 42 includes the storage controller 12 and a drive group 28. The storage controller 12 is made redundant in N-multiples (N is an integer equal to or more than 2) in order to cope with failure. The redundancy depends on a design policy, and the present embodiment illustrates an example in which the storage controller 12 is doubly redundant.

The storage controller 12 includes a processor 14, a memory 18, an FE I/F 52, and a BE I/F 54, wherein the FE I/F 52 and the BE I/F 54 are communication interfaces. The FE I/F 52 is connected to the host 10 of FIG. 1 via a communication network, and is an interface device for communicating with an external device. The storage controller 12 receives an I/O (read or write) request from the host 10 via the FE I/F 52. The BE I/F 54 is an interface device causing the storage controller 12 to communicate with the drives 26.

The memory 18 includes a program area 24, a buffer area 20, a cache area 22, and a management table area 30. In the present embodiment, the memory 18 is configured by a DRAM; however, for example, the memory 18 may be a static random access memory (SRAM) and the like. The program area 24, for example, stores storage control programs such as a write program and a read program.

The processor 14 performs various processes by executing a program stored in the program area 24 of the memory 18.

The buffer area 20 is a storage area for temporarily storing data (hereinafter, new data) requested to be written from the host 10 or data read from the drive 26. Data read from the buffer area 20 is deleted from the buffer area 20 or is in a deletable state.

Also in the cache area 22, the new data or the data read from the drive 26 is temporarily stored. In the present embodiment, one of differences with the buffer area 20 is that even if data has been read from the cache area 22, the data is not always deleted from the cache area 22.

In the present embodiment, there are cases where in the buffer area 20 and the cache area 22, an area where new data stored in the drive 26 is written in a cache memory area based on a write request from write from the host 10 is expressed as a "write plane" and an area where the data read from the drive 26 is written is expressed as a "read plane". In the description of the present embodiment, there is no special description, the write plane and the read plane depend on the buffer area 20 or the cache area 22.

The management table area 30 stores a buffer area management table 32, a cache memory area management table 34, a cache directory management table 35, an LDEV page management table 36, and a JOB # management table 38. Details of these tables will be described later.

The drive group 28 includes a plurality of drives 26 and a switch (SW) 56. The respective drives 26 is connected to the BE I/F 64 of the storage controller 12 via the SW 56. In the present embodiment, it is assumed that the drive 26, for example, is a storage device such as an SSD which is accessible at a high speed; however, other types of storage devices such as a HDD may be provided. Furthermore, the drive group 28 may have different type of storage devices, for example, the SSD and the HDD.

In addition, the present embodiment exemplifies the SSD which uses a NAND type flash memory as a storage medium; however, it is sufficient if the storage medium is a recordable nonvolatile semiconductor memory and the storage medium, for example, may be a magnetic random access memory (MRAM), a phase change random access memory (PRAM), a resistance random access memory (ReRAM) and the like. In addition, the present embodiment exemplifies an example in which the host 10 is connected to the storage controller 12 via a communication network; however, the hardware configuration of the storage system 42 may be similar to that of a server. For example, instead of the storage system 42 described in the above embodiment, a plurality of drives 26 or a plurality of drive groups 28 may be installed in (or connected to) a commercial computer (hereinafter, simply referred to as a "computer") such as a personal computer, and various programs described in the above may be executed on the computer. In this case, the computer receives an I/O request from the server, and stores data in a drive or reads the data from the drive.

Furthermore, in the case of a configuration in which various programs described in the above are executed on the computer, various programs executed on the real storage system, which are described in the above embodiment, and a program executed in the server may be configured to be executed on the same computer. In this case, for example, a hypervisor program forming a virtual machine may be executed on a computer, thereby forming, on the computer, at least a virtual machine that executes the program executed in the server and a virtual machine that executes various programs described in the above embodiment.

FIG. 3 illustrates an example of the LDEV page management table 36 according to the present embodiment. An I/O request from the host 10 includes I/O destination information. The I/O destination information is information indicating an LDEV #200 for storing the new data and an address in the LDEV in the case of a write request and an LDEV #200 for storing data to be read and an address in the LDEV in the case of a read request.

In the LDEV page management table 36, information on the LDEV #200, which is a logical Volume (not illustrated) created in the storage system 42, is managed. The LDEV is logically managed in a unit called blocks having a constant size, and a block #202 is given to each block. Objects having a size very smaller than that of the block are defined as sub-blocks, and sub-blocks #204 are given to the sub-blocks. In the LDEV page management table 36, a head address #206 of a physical address indicating a data storage position on the memory 18, a drive type 208 of a storage destination, and a flag 210 during a write process, which identifies whether the write process is being performed, are managed with respect to each sub-block #204. In FIG. 3, only an SSD is written in the drive type 208, but this is an example.

FIG. 4 illustrates an example of the JOB # management table 38 according to the present embodiment. JOBs are a unit of a program executed by storage software in order to process 1 I/O and each JOB has a JOB # which can be uniquely specified in the processor 14. In the present embodiment, when an I/O process is a fast write process, a fast write JOB #231 is given in addition to a JOB #230.

The JOB # management table has an idle JOB # queue 226, an idle fast write JOB # queue 227, and JOB access destination information 228. The JOB # and the fast write JOB # are managed with a queue, and when an I/O request is received from the host 10, the processor 14 acquires the JOB # through dequeuing from the idle JOB # queue 226. The idle JOB # queue 226 indicates a state in which a JOB #0 and a JOB #1 are enqueued. For example, when a process of the I/O request according to a JOB #2 is ended, the JOB #2 is returned and JOB #2 is enqueued to an idle JOB # queue pointer 220.

In the case of a fast write process, a fast write JOB # is acquired through dequeuing from the idle fast write JOB # queue 227. The fast write JOB # is also subjected to idle management similarly to the JOB #, and when a process of the I/O request according to a fast write JOB #2 is ended, the fast write JOB #2 is returned and the fast write JOB #2 is enqueued to an idle fast write JOB # queue pointer 221.

In the JOB access destination information 228, an access destination of the acquired JOB # is managed. For a JOB #230, head sub-block #232 of LDEV, which is an I/O destination, a data size 234 of I/O data, and information on a fast write JOB #231 are stored.

In the present embodiment, as described above, in order to distinguish the normal I/O process and the fast write process from each other, the JOB # and the fast write JOB # are given in the case of the fast write process. This is because the number of processing, in which the fast write process can be performed according to the use amount of resources such as a processor and a memory required for the fast write process, that is, the number of the fast write JOB # is limited. However, also in the case of the fast write process, only the JOB # may be given, and it is possible to simplify a process for giving the fast write JOB # or to simplify the amount of information on the JOB access destination information 228.

Management of the buffer area 20 in the present embodiment will be described using FIGS. 5 and 6 and management of the cache area in the present embodiment will be described using FIGS. 7 to 9. In the fast write process of the present embodiment, new data, old data, old parity, and new parity are stored in the buffer area 20.

FIG. 5 is a diagram of buffer area management information 170 according to the present embodiment. The buffer area 20 is logically managed every predetermined unit (Hereinafter, a buffer block 171). Furthermore, the buffer block is divided into buffer sub-blocks (not illustrated) having a smaller size. The buffer area management information 170 includes buffer block management information 176 of each buffer block and a buffer area capacity usage rate 181.

The buffer block management information 176 includes status information 178, error information 180, Read information 182, a write plane head address # and block #183, a read plane head address # and block #184, a data type 186, a JOB #188, and usage possibility information 190.

The status information 178 indicates whether data is stored in a buffer block, parity generation has been completed, stored data has been stored in the drive 26, and the like. The error information 180 is information indicating the state of an error of the storage system, and is set when the error has occurred. The Read information 182 is information indicating whether there is a read request for the data stored in the buffer block. The Read information 182 is normally OFF, and is updated to ON when there is the read request.

The write plane head address # and block #183 indicates the head address # of a physical address, which indicates a data storage position in the buffer area 20 ensured in order to store new data and new parity to be generated, and a block # which is a logical address. The read plane head address # and block #184 indicates the head address # of an area in the buffer area 20 ensured in order to store old data and old parity read from the drive 26 for new parity generation, and a buffer block #.

The data type 186 indicates whether data stored in a block is user data or parity.

The fast write JOB #188 indicates a fast write JOB # of a fast write process using a buffer block. In the present embodiment, an area in the buffer area 20 used in the fast write process has been decided and the buffer block # and the fast write JOB # correspond to each other in a one-to-one manner. However, the buffer block # and the fast write JOB # may not correspond to each other in a one-to-one manner, and it is possible to effectively utilize the buffer area 20 by using a buffer block available in the fast write process. The usage possibility information 190 indicates whether data stored in the buffer block can be accessible (read or written).

The buffer area capacity usage rate 181 indicates whether there is a vacancy in the buffer area 20. The buffer area capacity usage rate 181 is managed separately from the buffer block management information 176 of each buffer block. The buffer area capacity usage rate 181 may be regularly updated or may be updated at a timing at which the buffer area 20 has been used. In a state in which a threshold value is set in a usage rate, when the threshold value exceeds the usage rate, a new process in the fast write process is not performed, so that it is possible to avoid an interruption of a process due to insufficiency of the capacity of a buffer during the fast write process for example.

Details will be described later in FIGS. 14 to 16; however, there are cases where during the fast write process in the present embodiment, when an error occurs such as failure of a part of the storage system and timeout of a process, or when an interrupt of a read process occurs, the fast write process is switched to a normal write process to be described later in FIGS. 12 and 13. As the process is switched, a process is performed to move data stored in the buffer area 20 to the cache area 22. Therefore, in the present embodiment, the buffer area management information 170 includes the status information 178 as information corresponding to a data state 140 of block information 116 to be described later in FIG. 8. When the buffer area management information 170 includes the status information 178, it is possible to move data from the buffer area 20 to the cache area 22, thereby preventing loss of data.

<Description of Buffer Area>

FIG. 6 is a diagram of an example of management of the buffer area 20. The buffer area 20 is managed in units of buffer blocks, wherein each buffer block is managed by the buffer area management table 32. The data type and the like of the buffer block 171 are held by the buffer area management information 170 and idle block management of a buffer is managed by an idle area management Bit Map (BM) 172. The idle block management may be queue management.

FIG. 6 illustrates a state in which data is stored in the buffer block #2 of the buffer area 20. Information is held in the buffer block management information 176 of the buffer block #2 of the buffer area management information 170, and the idle area management BM 172 indicates complete storage of data in the buffer block #2.

<Description of Cache Memory>

FIGS. 7 and 8 illustrate a table group for managing the cache area 22 according to the present embodiment. The cache area 22 is managed in units of cache blocks and is controlled in a cache management table 40. The table group includes cache block management information 118 and cache directory information 104.

FIG. 7 illustrates the cache directory information 104 according to the present embodiment. The cache directory information corresponds to a hash table used when the processor 14 searches for a storage state of data of the sub-block #204 of the LDEV (an I/O destination) in the cache area 22. That is, the cache directory information 104 corresponds to an index to the cache block management information 118.

The cache directory information 104 includes hash information 158, a hash header #0 head pointer 160, and a hash header #0 end pointer 162.

The hash information 158 is information indicating a correspondence relation between a hash value of I/O destination information and a hash header, and as an entity of the hash header, there are head pointer 160 and the end pointer 162 which indicate the addresses of the block information 116. The cache directory information 104 has the head pointer 160 and the end pointer 162 for each hash header, but may have a structure in which a pointer of a head pointer having the large number of times of access is selected carefully and is held as a separate table as illustrated in FIG. 9 to be described later. According to the structure, it is possible to shorten a pointer search time and to reduce a data caching processing load.

FIG. 8 illustrates the block information 116 and the cache block management information 118 according to the present embodiment. The block information 116 is information on each cache block, and the cache block management information 118 includes the block information 116 on all cache blocks. The block information 116 includes a data state 140, error information 142, a directory forward pointer 144, a directory backward pointer 146, a queue forward pointer 148, a queue backward pointer 150, an allocated block # and head address #152, a locking bit 154, and a read plane flag 156 and a write plane flag 157.

The data state 140 includes clean, dirty (before generation), dirty (after generation), and free. A state in which data stored in a cache block has been stored in a drive is defined as "clean", a state before generation of parity related to data is defined as "dirty (before generation)", a state after the generation of the parity is defined as "dirty (after generation)", and a state in which data is not stored in a cache block is defined as "free".

The error information 142 is information indicating the state of an error having occurred in the storage system, and is set when the error has occurred.

The directory forward pointer 144 and the directory backward pointer 146 are pointers for connecting to the cache directory information 104. The queue forward pointer 148 and the queue backward pointer 150 are information for connecting to cache allocation management information 120 to be described later in FIG. 9.

The allocated block # and head address #152 indicates a cache block # and a head address # of a cache block ensured in order to actually store data in the cache area 22.

The locking bit 154 is a bit that prevents a process, other than an I/O process, from being performed in the ensured cache block when the I/O process is performed. The locking bit 154 is turned ON when a process is started.

The read plane flag 156 or the write plane flag 157 indicates whether a cache block is a read plane or a write plane.

FIG. 9 illustrates an example of management of the cache area 22. The cache area 22 is controlled in the cache management table 40 for each cache block. The cache management table 40 is configured with the cache allocation management information 120, the cache block management information 118, the cache directory information 104 that manages address information, and usage situation information 3.

The cache allocation management information 120 manages whether a cache block is a read plane or a write plane. In the cache allocation management information 120, queue management is performed, there is "free" as a queue header, and the block information 116 not allocated to the read plane and the write plane is enqueued. A cache block allocated to the read plane or the write plane is dequeued.

In the cache block management information 118, queue management is performed, and as a queue header, there are "clean" indicating a state in which data has been written in a drive, "dirty (before generation)" indicating a state before generation of parity, "dirty (after generation)" indicating a state after the generation of the parity, and "free" indicating a state in which a block has not been allocated. For each block, the queue forward pointer 148 of the block information 116 is enqueued to a queue of a queue header coinciding with the data state 140 of a current cache.

In the cache directory information 104, the pointer information 160 and 162 indicating the address of the block information 116 is managed. In the cache directory information 104, as illustrated in FIG. 9, in order to increase an address search speed, address information 114 of data is managed using pointer information 113 to be linked to the address information 114 of the data. The address information 114 is correlated with the block information 116 in a one-to-one manner. The pointer information 113 of the cache directory information 104, which is a hash table, is traced, so that only necessary address information 114 is quickly obtained without searching for all address information 114.

In the usage situation information 3, a threshold value of a capacity usage rate of a cache area is set in advance, and it is checked whether the usage rate reaches the threshold value and the capacity is exhausted. The usage rate may be updated at a timing at which a cache area has been ensured and released, or may be regularly updated in a constant time.

In the fast write process of the present embodiment, new data, old data, old parity, and new parity are stored in the buffer area 20 in which management information is easily controlled as compared with the cache area 22, so that an overhead due to creation or update of more management information is reduced and a load of the processor is suppressed.

<Description of Write Process>

The write process of the storage system 42 of the present embodiment will be described using FIGS. 10 to 13.

FIG. 10 is a flow of the write process of the present embodiment. The write process is started when the storage system 42 receives a write request from the host 10.

Step 241: When a write command is received from the host 10, the processor 14 accesses the JOB # management table 38 to newly acquire the JOB #.

Step 242: The processor 14 accesses the LDEV page management table 36 and turns on the flag during the write process of the sub-block #204 of the LDEV indicating a storage destination of new data requested to be written.

Step 244: The processor 14 determines whether to perform the write process as the fast write process or the normal write process. Conditions for the fast write process, for example, include that a size of new data is equal to or less than a sub-block size, data is not written over a plurality of sub-blocks, the buffer area capacity usage rate 181 does not exceed a threshold value, the fast write JOB # is not exhausted, and the like. These conditions may be changed by the policy of the storage system 42. When the fast write process is "possible", the procedure proceeds to step 255. When the fast write process is "not possible", the procedure proceeds to normal write process Frontend process step 246.

Step 255: When the fast write process is "possible", the processor 14 gives the fast write JOB # for the fast write process. The processor 14 accesses the JOB # management table 38 to newly acquire the fast write JOB #. The processor 14 adds information to the fast write JOB #231 of the JOB # acquired in Step 241 of the JOB access destination information 228. Thereafter, the procedure proceeds to fast write process step 256. The fast write process step 256 will be described in FIG. 11.

Step 246: When the fast write process is "not possible", the Frontend process of the normal write process using the cache area 22 is performed. The Frontend process is a process until new data from the host 10 is written in the cache area 22 and a response for the write request is transmitted to the host 10. Details will be described in FIG. 12.

Step 260: When the response is transmitted to the host 10 in step 246, the processor 14 accesses the LDEV page management table 36 and turns off the write process flag 210 of the sub-block #204, which has been turned on in step 242.

Step 250: Then, the processor 14 determines whether it is possible to perform the Backend process of the normal write process using the cache area 22. The Backend process of the normal write is a process in which new parity related to the new data stored in the cache area 22 is generated and the new data and the new parity are written in the drive 26. The determination of step 250 is periodically performed. The Backend process is "possible" when the capacity usage rate of the cache area 22 exceeds a threshold value or in an idle time of the processor 14 for example. Furthermore, when a predetermined time passes after a previous Backend process is performed, a next Backend process may be performed. In the case of "possible", the procedure proceeds to Step 252 and in the case of "not possible", the procedure returns to the determination of step 250.

Step 252: When the Backend process is "possible" in step 250, the processor 14 accesses the LDEV page management table 36 and turns on the write process flag 210 of the sub-block #204, which has been turned off in step 260.

Step 254: Then, the processor 14 performs the Backend process of the normal write process using the cache area 22. Details will be described in FIG. 13.

Step 260: When the fast write process (step 256) or the Backend process of the normal write process (step 254) is ended, the processor 14 accesses the LDEV page management table 36 and turns off the write process flag 210 of the sub-block #204.

Step 248: Then, the processor 14 releases the JOB # acquired in step 241. Specifically, the processor 14 accesses the JOB # management table 38 and deletes information on the JOB #230 acquired in step 241 of the JOB access destination information 228.

In this way, the fast write process of the present embodiment is completed.

<Fast Write Process>

FIG. 11 illustrates a flow of the fast write process in the present embodiment.

As described in FIG. 1, in the fast write process of the present embodiment, the processor 14 generates the new parity according to the response for the write request from the host 10, and stores the new data and the new parity in the drive 26.

Furthermore, the new data 100 from the host 10, and the old data 102 and the old parity 104, which are read from the drive 26 in order to generate the new parity 106, are not stored in the cache area 22 as with the related caching, and are stored in the buffer area 20 in the present embodiment.

According to the process of the aforementioned embodiment, in the case where the response for the write request from the host and the parity generation process are asynchronously performed, when the FE process and the BE process are respectively started and ended, it is necessary to overlappingly perform processes for ensuring and releasing areas of a cache memory required for the respective processes. However, in the BE process, an overhead of cache control such as finding data not stored in the HDD from the cache memory can be reduced. Furthermore, in order to store the new data 100, the old data 102, the old parity 104, and the new parity 106 in the buffer area 20, since it is not necessary to create and update the management information of the cache area 22, the overhead of the cache control can be reduced.

The fast write process (step 256) is started when the write request is received from the host 10 and it is determined that the fast write process is "possible" in step 244 of FIG. 10.

Step 360: The processor 14 ensures, in the buffer area 20, a write plane which is an area for storing the new data and the new parity and a read plane which is an area for storing the old data and the old parity. Specifically, the processor 14 accesses the buffer block management information 176 of a buffer block corresponding to the fast write process JOB # acquired in step 255, sets an initial value, and turns on the idle area management BM 172 of the buffer block.

In the related art, since the generation of the new parity and the storage of the new data and the new parity to the drive are performed asynchronously with the write request, only an area for storing the new data is ensured before data is transmitted from the host 10. When only the area for storing the new data is ensured as with the related art and the fast write process of the present embodiment is performed, if the capacity of the buffer area 20 is exhausted before a process for generating the new parity 106 for example, since it is not possible to ensure an area for storing the old data 102 and the old parity 104 and the process for generating the new parity 106 is not performed, it is not possible to complete the fast write process. In this regard, in the present embodiment, before data is transmitted from the host 10, areas for storing the new data 100, the new parity 106, the old data 102, and the old parity 104 are ensured, thereby preventing a process from being incomplete due to the exhaustion of the capacity of the buffer area 20.

When the total four sub-buffer blocks corresponding to a write plane for storing the new data 100 and the new parity 106 and a read plane for storing the old data 102 and the old parity 104 are ensured in a continuous area, since it may be managed by the number of areas ensured as a head address, it is possible to simply holding of information on the buffer block management information 176. Even if the four sub-buffer blocks are not continued, when the write plane is continuously ensured by total two sub-buffer blocks and the read plane is continuously ensured by total two sub-buffer blocks, management information is simplified as compared with a case where separated one sub-buffer block is ensured. The sub-buffer block indicates a unit for managing buffer blocks in a smaller unit.

In the present embodiment, in order to prevent loss of data when failure occurs in the storage controller 12, the storage controller 12 is duplicated. Therefore, a (hereinafter, own) storage controller 12 having the processor 14 currently managed and a (hereinafter, another) storage controller 12 to be duplicated ensure an area respectively; however, in the other storage controller 12, the read plane does not need to be ensured.

Step 362: The new data 100 is transmitted from the host 10 to the write plane of the buffer area 20 ensured in step 360. Specifically, when the write plane and the read plane are ensured in the buffer area 20, the processor 14 transmits, to the host 10, a signal indicating that data may be transmitted to the buffer area 20, and when the signal is received, the host 10 transmits the new data 100 and the new data 100 is stored in the write plane of the buffer area 20.

Step 364: The new data 100 for dual writing is transmitted to the buffer area of the other storage controller 12 ensured in step 360. Dual writing of data is for ensuring redundancy and improving reliability as a storage system.

Step 366: The status information 178 of the buffer block management information 176 of a buffer block, in which the write plane ensured in step 360 exists, is updated. Specifically, a flag indicating that new data has been written may be set, or a buffer sub-block in a block, in which the new data has been written, may be managed by a bit map. The buffer block management information is updated in own and another storage controller 12.

Step 368: The completion of the write request process is transmitted to the host 10. In the present embodiment, the procedure proceeds to a step for generating the new parity according to the completion response to the host. Specifically, the following step 370 and step 372 are performed.

Step 370: The old data and the old parity are transmitted to the read plane ensured in step 360 from the drive 26.

Step 372: The new data, the old data, and the old parity are subjected to an XOR calculation to create new parity. The new parity is stored in the read plane ensured in step 360.

Step 374: The new parity is transmitted to the write plane of the other storage controller ensured in step 360.

Step 376: The buffer area management information 170 of a buffer block, which stores parity and data, is updated in the own and the other storage controller 12. The update content of the buffer block management information 176 of the write plane may be equivalent to that of step 366. In the update content of the buffer block management information 176 of the read plane, the usage possibility information 190 is updated from "possible" to "not possible" in addition to the content of step 366. Furthermore, a write plane flag of a sub-buffer block recorded with the new data and the new parity is switched to a read plane flag. This is for transmitting the new data and the new parity recorded on the read plane to the drive 26.

Step 378: The new data 100 and the new parity 106 are stored from the buffer area 20 to the drive 26 for storage.

Step 380: The area ensured in step 360 is released. In the release, specifically, data is written by 0. Furthermore, it is sufficient if the idle area management BM 172 of a buffer block including the ensured area is turned off. When the buffer is released, data stored in the cache area 22 in relation to the write process is deleted from the buffer area 20 or is in a deletable state. When the buffer block is released, a JOB # corresponding to the buffer block is also released.

In this way, the fast write process is completed.

<Normal Write Process Frontend Process>

FIG. 12 is a flow of the normal write process Frontend process 246 using the cache area 22 according to the present embodiment.

Step 270: It is determined whether it is necessary to newly ensure a cache memory area for storing new data from the host 10. For example, when a write request is a request for updating data already stored in the drive 26 and the data is stored in the cache area 22, it is not necessary to newly ensure an area for storing the data in the cache area 22. As a result of the determination, when it is necessary to ensure the cache memory area (Yes), the procedure proceeds to step 272, and when it is not necessary to ensure the cache memory area (No), the procedure proceeds to step 274.

Step 272: A cache area for storing data is newly ensured. Only a write plane for storing data from the host 10 is ensured. In the cache directory information 104, the hash information and the like 114 are ensured, dirty (before generation) 110 is connected with a queue in the block information 116, and the write plane is connected with a queue in the cache allocation management information 120.

Step 274: A lock of a cache block including the area ensured in step 272 is acquired. Specifically, the locking bit 154 of the block information 116 is turned on. The locking bit 154 is turned on, so that another process such as a read process is not performed for the cache block for example.

Step 276: New data, which is data to be written from the host 10, is stored in the cache area 22. Thereafter, the procedure proceeds to step 278.

Step 278: In order to prevent loss of data when failure occurs in the storage controller 12, new data is transmitted to the cache memory area of the other storage controller 12. In the other storage controller 12, the ensuring of a cache block and lock acquirement are performed in step 272 and step 274, respectively.

Step 280: Information indicating that writing of the new data to the cache memory area 22 has been completed is stored in the data state 140 of the block information 116. The information indicating that the writing of the new data has been completed may be a flag indicating that the new data has been written or a bit map that manages a sub-block of a block in which the new data has been written. The block information 116 is updated in own and another storage controller 12.

Step 282: The completion of the write process is notified to the host 10.

Step 284: The locking bit 154 of the cache memory area of the block information 116 turned on in step 274 is turned off. In this way, the Frontend process of the normal write process is completed. In the normal write process, since the parity is generated asynchronously with the write request, the new data 100 is stored in the cache memory area 22 as is even if the Frontend process is completed, so that the ensured cache area is not released.

<Normal Write Process Backend Process>

FIG. 13 is a flow of the normal write process Backend process 258 using the cache memory area 22 according to the present embodiment. In the present embodiment, a RAID 5 configuration is assumed as an example; however, other RAID configurations such as a RAID 6 may be used.

Step 290: A cache area for storing the old data and the old parity read from the drive 26 in order to generate new parity and a cache area for storing the generated new parity are ensured, and a lock is acquired. Each of the own and the other storage controller 12 ensures the cache area 22 and acquires a lock.

Step 291: The lock of the cache area for the new data released in step 284 is acquired. This is for preventing other processes from being performed for the cache area for the new data during the Backend process.

Step 292: The old parity and the old data are stored in the cache areas for the old parity and the old data ensured in step 290. The old parity and the old data may be transmitted by only the own storage controller 12.

Step 294: The new data, the old data, and the old parity are subjected to an XOR calculation to generate new parity, and the new parity is stored in the cache area for the new parity ensured in step 290.

Step 296: The created new parity is transmitted to the cache area for the new parity of the other storage controller 12.

Step 298: The own and the other storage controller 12 update the block information 116 of a block for storing parity and data. In relation to the read plane of the cache block for the parity, the update content of the block information 116 may be equivalent to that of step 280. In relation to the write plane, a read plane discarding process is performed in addition to the content of step 280. Since the latest data is stored in the write planes for data and parity, a process is performed to discard a read plane in which current old data and old parity are stored and to switch the write plane to the read plane in order to be able to store data to be transmitted from the host in the future. Specifically, in the switching process, the write plane flag 157 is turned off and the read plane flag 156 is turned on with respect to an area ensured as a current write plane, so that it is treated as a read plane.

Step 300: The new data and the new parity are transmitted to the drive 26.

Step 302: The lock of the cache block for the parity and the cache block for the data acquired in step 290 is released. It is sufficient if the locking bit 154 of the block information 116 is turned off. The lock release is performed in the own and the other storage controller.

Step 304: It is determined whether it is necessary to release the cache block including the area ensured in step 290. Since the lock is released in step 302, it is possible to receive a write request from the host 10. When there is an I/O request from the host 10, if data related to the request has been stored in a cache memory, since it is possible to increase a processing speed as compared with a case of directly accessing a HDD, a cache memory area may not be released directly after step 302 is ended, a cache memory area release process may be regularly performed, or a cache memory area usage rate may reach a threshold value.

When the release is required, the procedure proceeds to step 306, and when the release is not required, the determination of step 304 is repeated.

Step 306: The cache areas for the new data, the old data, the old parity, and the new parity are released. Specifically, the block information 116 including the areas, the cache allocation management information 120, and the cache directory information 104 are deleted from the cache management table 34.

In this way, the normal write process Backend process is completed.

In the fast write process of the present embodiment, when an error occurs in the storage system during the process or when there is a read request for new data, there are cases where the fast write process is switched to the normal write process and an error process ora read process is performed. Therefore, a process when an error has been detected, a process when a read request has been received, and a switching process to the normal write process will be described using FIGS. 14 to 16, respectively.

<Error Detection Process>

During the write request process, failure may occur in a part of the storage system or an error such as process timeout may occur. FIG. 14 is a processing flow when the error has been detected.

Step 386: When the error is detected, information indicating an error state is stored in the error information 142 of the block information 116 ensured when a process has been stopped or the error information 180 of the buffer block management information 176. The information indicating an error state, for example, uses a bit.

Step 388: It is checked whether a write process being currently performed is the fast write process. For example, if the JOB access destination information 228 is checked, since it is possible to know whether the fast write JOB # has been given at the occurrence time point of the error, the determination is possible. When the determination is Yes, the procedure proceeds to step 390 and when the determination is No, the procedure proceeds to step 392.

Step 390: When the write process being currently performed is the fast write process 22, the write process is switched to the normal write process. The reason for switching to the normal write process is for handling of the error process uses the error process handling of the normal write process. Details of the switching process will be described in FIG. 16.

Step 392: An error process is performed based on the error state set in step 388. The error process, for example, is a process in which an alert is output when failure occurs in the processor 14 or the memory, or data is recovered or data is moved to another drive 26 when failure occurs in the drive 26.

<Read Process>

FIG. 15 is a flow of the read process in the present embodiment. In the present embodiment, similarly to the normal write process, the read process uses the cache area 22.

The read process is started when the storage system 42 receives a read request from the host 10.

Step 420: The processor 14 determines whether data requested to be read is being subjected to a write process. Specifically, the processor 14 accesses the LDEV page management information 36 and determines whether the flag 210 during a write process of the sub-block #204 corresponding to an address to be read is turned on, based on I/O destination information included in the read request. When the flag during a write process is ON, that is, in the case of Yes, the procedure proceeds to step 422, and when the flag during a write process is OFF, that is, in the case of No, the procedure proceeds to step 430.

Step 422: The processor 14 further determines whether the data requested to be read is being subjected to the fast write process. Specifically, the processor 14 accesses the JOB access destination information 228 and checks whether the fast write JOB #231 has been given to the sub-block #204 corresponding to the address to be read. When the fast write JOB #231 has been given, the data requested to be read is being subjected to the fast write process. When the data is being subjected to the fast write process (Yes), the procedure proceeds to step 424, and when the data is not being subjected to the fast write process and is being subjected to the normal write process (No), the determination of step 420 is performed again.

Step 424: The processor 14 turns on the Read information 182 of the buffer block management information 176 of a buffer block in which the data to be read is stored.

Step 390: A switching process 390 to the normal write is performed. Step 390 will be described in FIG. 16. After step 390 is ended, the determination of step 420 is performed again.

Step 430: Since the data to be read is not being subjected to the write process, the read process is performed. The processor 14 accesses the cache management table 40 in order to check whether the cache area 22 has already been allocated to a block including the address. In the case of allocation (Yes), the procedure proceeds to step 434, and in the case of non-allocation (No), the procedure proceeds to step 432.

Step 432: In the cache memory area 22, a cache area for storing the data to be read is ensured.

Step 434: The area ensured in step 432 is locked. The locking bit 154 of the block information 116 is turned on.

Step 436: The data to be read is transmitted from the drive 26 to the cache area locked in step 434.

Step 438: The data stored in the cache area in step 436 is transmitted to the host. Step 440: Read process completion is transmitted to the host.

Step 442: The lock ensured in step 434 is released. In this way, the read process is completed.

<Switching Process>

FIG. 16 is a processing flow of the normal write process switching process 390 according to the present embodiment. As described above, when an error is detected, if a read request is received, a process performed in switching to the normal write process will be described.

Step 400: It is determined whether writing of the new data and the new parity to the drive 26 is completed in the fast write process. Specifically, if a buffer is being subjected to the release process in step 380 of FIG. 11, it is determined that the writing has been completed. When the data writing has been completed (Yes), the switching process is completed, and when the data writing has not been completed (No), the procedure proceeds to step 402.

Step 402: It is determined whether new parity generation is completed in the fast write process. Specifically, it is determined to check the status information 178 of the buffer block management information 176. When the new parity generation has been completed, this is because the status information 178 has been updated in the buffer management information update of step 376 of FIG. 11. When the new parity generation has been completed (Yes), the procedure proceeds to step 404, and when the new parity generation has been completed (No), the procedure proceeds to step 412.

Step 404: A cache area for new data for transmitting the new data from the buffer area 20 is ensured and a lock is acquired.

Step 406: A cache area for new parity for transmitting the new parity from the buffer area 20 is ensured and a lock is acquired.

Step 408: The new data and the new parity are copied respectively from the buffer area 20 to the cache areas ensured in steps 404 and 406. Moreover, the error information of the management information 176 for data and for parity is copied from the buffer area management information 170 to the cache management information 40 corresponding to the cache areas ensured in steps 404 and 406 respectively, is queued to a queue header 100 proper for the block information 116 from the status information of the buffer area management information 170, and is queued to the read plane and the write plane of the cache allocation management information 120. The copy destinations are the own and the other storage controller 12.

Step 410: Since the processes of the area ensuring, the data and management information copy, and the like have been completed, the fast write process is switched to the normal write process. Since the new parity has been generated, it is sufficient if the normal write process is performed from step 296 of FIG. 13.

Step 412: A cache area for new data for transmitting the new data from the buffer area 20 is ensured and a lock is acquired.

Step 414: A process similar to that of step 408 is performed. Specifically, the new data is copied from the buffer area 20 to the cache area ensured in step 412. The management information 176 is also copied to the cache management information 40.

Step 416: Since the new parity is not generated, it is sufficient if the normal write process is performed from step 290 of FIG. 13.

Step 418: The buffer is released. This process is equivalent to that of step 380 of FIG. 11. In this way, the switching process is completed.

The read process and the switching process to the normal process in the present embodiment are similar in the following embodiments.

FIG. 24 is an example of a menu screen 2000 and a management screen 2100 in the present embodiment. The menu screen 2000 has a Flash high performance mode setting area 2001. A manager selects "ENABLE" or "DISABLE" of the Flash high performance mode setting area 2001, so that it is possible to enable or disable the fast write process of the present embodiment. The management screen 2100 has a buffer area 2101. The "ENABLE" of the buffer area 2101, for example, indicates that a usage rate of the buffer area 20 is equal to or less than a threshold value and the fast write process is possible.

The above is a description for the present embodiment.

The fast write process of the present embodiment has a characteristic that the processor 14 generates new parity according to a response for a write request from the host 10 and stores new data and the new parity in the drive 26. According to the characteristic, in the case where the response for the write request from the host and the parity generation process are asynchronously performed, when the FE process and the BE process are respectively started and ended, it is necessary to overlappingly perform processes for ensuring and releasing areas of a cache memory required for the respective processes. However, in the BE process, an overhead of cache control such as finding data not stored in the HDD from the cache memory can be reduced.

Furthermore, in order to store the new data 100, the old data 102, the old parity 104, and the new parity 106 in the buffer area 20, since it is not necessary to create and update the management information of the cache memory area 22, the overhead of the cache control can be reduced.

Thus, a load of the processor is suppressed, so that the number of requests from the host processible per unit time is increased and it is possible to increase the speed of the storage system.

Furthermore, since the new parity is generated after the response for the write request from the host 10, the fast write process of the present embodiment is proper for a system requiring a fast response.

Furthermore, there are cases where the fast write process is switched to the normal write process in the present embodiment; however, in the present embodiment, since the buffer area management information 170 includes the status information 178 as information corresponding to the data state 140 of the block information 116, it is possible to move data from the buffer 20 to the cache memory area 22, so that it is possible to prevent the loss of data.

Embodiment 2

In the present embodiment, a description will be provided for a case where in the fast write process, only the old data 102 and the old parity 104 are stored in the buffer area 20 and the new data 100 and the new parity 106 are stored in the cache memory area 22. Hereinafter, a description overlapping the Embodiment 1 will be omitted.

Since the old data 102 and the old parity 104 are stored in the buffer area 20, it is possible to reduce an overhead of cache control due to creation or update of management information of the cache memory area as compared with the related art.

Furthermore, in the Embodiment 1, at the time of switching from the fast write process to the normal write process, it depends on the progress of the write process, but it is necessary to copy the new data, the old data, the old parity, and the new parity from the buffer area 20 to the cache memory area 22 and to take over the buffer management information to the cache management information. However, in the configuration of the Embodiment 2, since the new data and the new parity are stored in the cache memory area 22, it is sufficient if the copy of only the old data and the old parity and the copy of the management information are performed, so that it is possible to reduce a load of switching from the fast write process to the normal write process. Furthermore, only the copy of the management information may be performed, and the old data and the old parity may be read again to the cache memory area 22 from the drive.

FIG. 17 is a flow of the fast write process in the present embodiment. The difference with the flow of the fast write process 256 of FIG. 11 of the Embodiment 1 is that the write plane is ensured in the cache area 22. In each process, the difference between the content described in FIGS. 11 to 13 of the Embodiment 1 and FIG. 11 will be described.

Step 450: When the fast write process is "possible", cache areas for new data and new parity are ensured and a lock process is performed. An actual operation is equivalent to steps 270, 272, and 274 of FIG. 12 of the normal write process.

Step 452: Buffer areas for old data and old parity are ensured and initial setting of the buffer area management information 170 is performed. Details are equivalent to step 360 of FIG. 11.

In the present embodiment, since only a read plane is ensured in the buffer area 20, it is sufficient if the write plane head address # and block #183 and the read plane head address # and block #184 of the buffer block management information 176 of FIG. 5 are used as head address # and block # for the old data and head address # and block #184 for the old parity in the present embodiment. Furthermore, two areas for the old data and the old parity are ensured in a continuous area and are managed by the number of sub-blocks ensured as head addresses, so that it is possible to simply holding of the buffer area management information 170.

In addition, since time is required for the buffer area ensuring process of the present step, when the present step is performed after a write process completion response is transmitted to the host 10 in step 368, it is possible to shorten a response time to the host 10. At a timing at which a fast write JOB # has been set, since a buffer area corresponding to the fast write JOB # has been reserved, even if the buffer area is ensured after step 368, there is no problem that it is not possible to ensure an area due to the exhaustion of the buffer area.

Thereafter, the new data is transmitted to another storage controller for dual writing (step 278), the cache management information is updated (step 280), and the write process completion response is transmitted to the host 10 (step 368).

Then, the old data and the old parity are transmitted to and stored in the buffer areas ensured in step 452 (step 370) according to the response to the host 10, new parity is generated (372), and the new parity is transmitted to the other storage controller for dual writing (step 374).

Step 454: Information, which indicates the generation of the new parity related to the new data and the storage of the new parity to the cache memory area 22, is stored in the data state 140 of the block information 116. Details are equivalent to step 280 of FIG. 12 and step 298 of FIG. 13.

Step 458: The new parity and the new data are stored in the drives in step 300, and the buffer areas for the old data and the old parity ensured in step 452 are released. Details are equivalent to step 380 of FIG. 11.

Step 460: The cache areas for the new data and the new parity ensured in step 450 are released. Details are equivalent to step 306 of FIG. 13.

According to the configuration of the fast write process of the present embodiment illustrated in FIG. 17, in addition to the aforementioned effects in the Embodiment 2, the processor 14 performs a process for generating the new parity according to the response for the write request from the host 10, when the FE process and the BE process are respectively started and ended due to asynchronous execution of the response for the write request from the host and the parity generation process, it is necessary to overlappingly perform processes for ensuring and releasing areas of a cache memory required for the respective processes. However, in the BE process, an overhead of cache control such as finding data not stored in the HDD from the cache memory can be reduced.

<For Modification Example>

In the present embodiment, a modification example of a case where in the fast write process, only the old data 102 and the old parity 104 are stored in the buffer area 20 and the new data 100 and the new parity 106 are stored in the cache memory area 22 will be described.

In the modification example, a process for generating the new parity is performed asynchronously with the write process completion response to the host 10. That is, the fast write process is divided into a Frontend process and a Backend process. In this way, for example, at a timing at which an interruption of a read process occurs, the number of times of switching from the fast write process to the normal write process is reduced, so that it is possible to more effectively reduce a load of the switching process described in the Embodiment 2.

The Frontend process of the present modification example is identical to the normal write process Frontend process of FIG. 12, and the new data and the new parity are stored in the cache memory area 22. The fast write process and the normal write process are branched from the Frontend process.

FIG. 18 illustrates the Backend process of the present modification example. Hereinafter, the Backend process will be described while focusing on the difference with FIG. 11.

When it is determined that it is possible to perform the Backend process (step 250), the flag during the write process of the sub-block #204 of the LDEV indicating a storage destination of the new data requested to be written is turned on (step 242).

Step 470: It is determined whether the fast write process is possible. Detailed conditions are identical to step 244 of FIG. 9. When the fast write process is "possible" in step 470, a fast write JOB # is acquired in step 255. When the fast write process is "not possible", the normal write process Backend process is performed in step 258.

Step 472: When the fast write process is "possible" in step 470 and the fast write JOB # is acquired in step 255, the Backend process of the fast write process is performed. Details of the process will be described in FIG. 19.

When the normal write process Backend process 258 or the fast write process Backend process 472 is ended, the flag during the write process of the sub-block #204 of the LDEV, which has been turned on in step 242, is turned off (step 260), and the JOB # is released (step 248).

In this way, the Backend process of the present modification example is completed.

FIG. 19 is a flow of the fast write process Backend process in the present modification example. This is obtained by separating steps before the completion response of step 368 to the host 10 from FIG. 11 of the Embodiment 1. Hereinafter, the difference with FIG. 11 will be described.

Step 480: Ensuring of the cache area for the new parity and a lock process are performed. Since the cache area for the new data has already been ensured in the Frontend process, only the new parity is ensured.

Step 482: The lock of the cache area for the new data is acquired. This is because the lock of the cache area for the new data has been released in step 284 of the normal write process Frontend process 24. Details are similar to step 291 of FIG. 13.

Then, buffer areas for old data and old parity are ensured (step 452), the old data and the old parity are stored in the ensured buffer areas (step 370), new parity is generated (372), and the new parity is transmitted to another storage controller for dual writing (step 374).

The cache management information is updated (454), the new data and the new parity are stored in the drive (step 300), the buffer areas for the old data and the old parity ensured in step 452 are released (step 350), and lock release of the cache areas for the new data and for the new parity and area release are performed (306).

The above is a description for the present embodiment and the modification example.

In the present embodiment, since the new data and the new parity are stored in the cache memory area 22, it is sufficient if the copy of only the old data and the old parity and taking over of the management information are performed, so that it is possible to reduce a load of switching from the fast write process to the normal write process.

In addition, the processor 14 performs a process for generating the new parity according to a response for the write request from the host 10, so that it is possible to reduce an overhead of cache control due to asynchronous execution of the response for the write request from the host and the parity generation process. Furthermore, in the modification example, the fast write process is also divided into the Frontend process and the Backend process. In this way, it is possible to more effectively reduce a load of the switching process of the Embodiment 2.

Embodiment 3

In an Embodiment 3, a parity calculation process in the fast write process is performed in a flash drive having a calculation processing function.

FIG. 20 is a schematic diagram of the present embodiment. The storage system 42 includes the storage controller 12 having the processor 14 and the memory 18, and flash drives 60 and 62 having a calculation processing function, and for example, is connected to the host 10 via a communication network such as a storage area network (SAN). In the present embodiment, user data is stored in the flash drive 1 60 and parity is stored in the flash drive 2 62.

When (1) the processor 14 of the present embodiment receives the write request of the new data 100 from the host 10, (2) the new data 100 from the host 10 is stored once in the buffer area 20 and is transmitted to the flash drive 1 60 stored with the old data 102. In the embodiments 1 and 2, in order to prevent data loss of the new data, the new data is dually held between the storage controllers 12. However, in the Embodiment 3, the new data is also transmitted to the flash drive 2 62 stored with the new data, thereby preventing data loss in which the new data is dually held between the flash drives 60 and 62. (3) When the new data 100 is dually written in the flash drives 60 and 62, the processor 14 transmits a response for the write request to the host 10.

(4) In response to the transmission of the response to the host 10, a parity generation process is performed. In the present embodiment, in the flash drive 1 60, the new data 100 and the old data 102 are subjected to an XOR calculation to generate intermediate data 473. (5) The intermediate data 473 is transmitted to the flash drive 2 62 via the buffer area 20. (6) In the flash drive 2 62, the intermediate data 473 and the old parity 104 are subjected to an XOR calculation to generate the new parity 106. (7) When the generation of the new parity 106 is completed, since the new data 100 written in the flash drive 2 62 is not finally required, the new data 100 is deleted.

In the present embodiment, since the parity calculation process is performed in the flash drive, it is possible to reduce a load of the processor 14 of the storage controller 12 and the number of times of access to the memory 18 is further reduced, so that it is possible to reduce a load of a memory band of the storage controller 12. In addition, similarly to the Embodiment 1, it is also possible to suppress the load of the processor 14 of the storage controller 12 due to the execution of the new parity generation process according to a response to the host 10, the number of requests from the host processible per unit time is increased, and it is possible to increase the speed of the storage system.

FIG. 21 is a configuration diagram of the flash drive of the same embodiment. For example, data stored in the buffer area 20 of the storage controller 12 is stored once in a buffer 500 of a controller 494 of the flash drive via a data transmission control unit 492 from a FE I/F 490. Thereafter, the data is written in FM chips 516 via a BE I/F 514. The buffer 500 may be the same area as a main memory 496.

Processes in the flash drives 60 and 62 are performed when a processor 498 executes a flash drive control program 502 in the main memory 496. If necessary, the processor 498 accesses flash drive information 504, FM chip information 506, physical block information 508 for managing a physical space, logical block information 510 for managing a logical space, management information of a logical physical map 512 for managing correspondence between the physical space and the logical space, and a buffer capacity usage rate 511. The elements, other than the FM chips 516, are defined as a controller 494.

FIG. 21 is an explanation diagram of the physical block information 508, the logical block information 510, and the logical physical map 512 which are the management information of the flash drive 60, 62 of the same embodiment.

The physical block information 508 manages physical blocks which are spaces obtained by dividing physical areas of the flash drive 60,62 in a uniform size. The sizes of the management blocks of the flash drive and the blocks managed in the flash drive may be identical to one another or different from one another. Hereinafter, a description will be provided for a case where the physical blocks and the blocks of the storage controller 12 have the same size.

An ID is given to each physical block, and as a physical block ID 522, real addresses corresponding to an ID list are managed. An idle capacity of the physical block is managed with an idle capacity 524 in the physical block and an ID of an idle physical block is managed with an idle physical block queue.

The logical block information 510 manages logical blocks which are spaces obtained by dividing logical areas of the flash drives 60 and 62 in a uniform size. An ID is given to each logical block, and as logical block IDs, logical addresses corresponding to an ID list are managed. The logical block size and the physical block size are identical to each other, but the number of logical block IDs is equal to or more than the number of physical block IDs. Hereinafter, a description will be provided for a case where the logical block ID and the block # of the storage controller 12 coincide with each other. When they do not coincide with each other, a conversion table of the logical block ID and the block # of the storage controller 12 is additionally required. A data amount and a current use amount, which are storable in the logical area, are indicated by a logical block data storage amount.

The logical physical map 512 manages a correspondence relation between a logical address (a logical block address, hereinafter, LBA) indicating a logical block and a physical address (a physical block address, hereinafter, PBA) indicating a physical block.

FIG. 22 is a flow of the fast write process of the present embodiment. An entire write process flow is identical to that of FIG. 10. Step 244: The condition of the fast write process possibility determination includes whether there is an idle area in the buffer 500 of the flash drives 60 and 62.

Step 552: As a buffer for storing once new data from the host 10, the buffer area 20 of the storage controller 12 is ensured. It is sufficient if the area is ensured by one sub-block for storing the new data 100.

Step 554: A buffer 500 for transmitting new data to the flash drive 1 60 stored with old data to be updated by the new data is ensured.

Step 556: A buffer 500 for transmitting the new data to the flash drive 2 62 stored with old parity related the old data is ensured.

Step 558: The new data from the host 10 is transmitted to the buffers 500 of the flash drive 1 60 and the flash drive 2 62 stored with the data in step 554 and step 556 via the buffer stored in step 552.

Step 560: Since the dual transmission to the flash drives 60 and 62 has been completed, the status information of the buffer management information 176 of the storage controller 12 ensured in step 552 is updated to new data transmission completion.

Step 562: A write process completion response is transmitted to the host 10.

Step 564: In the flash drive 1 60, the new data 100 and the old data 102 are subjected to an XOR calculation to generate the intermediate data 473. It is sufficient if the intermediate data 473 is stored only in the buffer 500, and does not need to be written in the FM chip 516.

Step 566: The intermediate data 473 is transmitted to the buffer 500 of the flash drive 2 62 via the buffer area 20. It is sufficient if the area ensured in step 552 is reused as the buffer area 20 used for transmission.

Step 568: In the flash drive 2 62, the intermediate data 473 and the old parity 104 are subjected to an XOR calculation to generate the new parity 106. In this step, the new parity 106 may be stored only in the buffer 500, and does not need to be written in the FM chip 516. The processor 498 of the flash drive 2 notifies the processor 14 of the storage controller 12 of the parity generation completion.

Step 570: The processor 14 of the storage controller instructs the processor 498 of the flash drive 2 62 to fix the new parity. The flash drive 2 62 having received the instruction newly ensures a physical block address for the new parity 106 and updates a PBA for the LBA of the old parity 104 to a PBA of the new parity 106, that is, switches logical mapping, in the logical physical map 512, so that it is possible to destruct old parity and to recognize the new parity from the storage controller 12.

Step 572: In the same method as that of step 570, in the logical physical map 512, a PBA for the LBA of the old data 102 is updated to a PBA of the new data 100, so that new data is fixed by switching the logical mapping.

Step 574: The buffer area 20 of the storage controller 12 ensured in step 552 is released. The release method is the same as that of step 380. Then, the procedure proceeds to step 576.

Step 576: Since all the new data and the new parity have been fixed, the new data held for data loss in step 556 and step 558 and stored in the flash drive 2 62 is deleted, so that the procedure is completed.

FIG. 23 is a processing flow of the normal write process switching determination 580 of the same embodiment.

Step 582: It is determined that the new parity 106 and the new data 100 is fixed. In this step, it is sufficient if it is checked whether there is the old data 102 in the flash drive 1 60 and the flash drive 2 62 or there is the buffer management information 176 of the storage controller. In the case of Yes, the procedure proceeds to step 598, and in the case of No, the procedure proceeds to step 272 and step 274.

In step 272, a cache area for new data is ensured, and in step 274, a lock of the cache area for the new data is acquired. Details are similar to steps 272 and 274 of FIG. 12.

Step 1100: It is determined whether the new data is transmitted to the flash drive. In this step, it is sufficient if it is checked whether there is the new data 100 in the flash drive 1 60 and the flash drive 2 62 or the status information 178 of the buffer management information 176 of the storage controller 12 is checked. In the case of transmission completion (Yes), the procedure proceeds to step 596, and in the case of transmission incompletion (No), the procedure proceeds to step 414.

Step 414 is a process similar to that of FIG. 16. The new data is copied from the buffer area 20 to the cache area 22. The buffer block management information 176 is also copied to cache management information.

Step 596: The new data is copied from the buffer 500 of the flash drive 1 60 or the flash drive 2 62 to the cache area 22 ensured in step 272, and the error information of the management information 176 for data and parity is copied from the buffer area management information 170 of the storage controller 12 to the cache management information 40 ensured in the previous step, is queued from the status information of the buffer area management information 170 to the queue header 100 appropriate for the block information 116, and is queued to the write plane 124 of the cache allocation management information 120. The copy destination is the cache management tables 40 of the own and other storage controllers 12.

Step 592: The fast write process 22 is switched to the normal write process 24 with respect to a write I/O. It is sufficient if the normal write process 24 (a switching destination) is continued from step 290 of FIG. 13.

Step 598: The buffer 500 of the flash drive 1 60 is released. Accordingly, the new data is also deleted.

Step 590: The buffer 500 of the flash drive 2 62 is released. Accordingly, the new data is also deleted.

Step 588: The buffer area 20 of the storage controller is released. The release method is equivalent to step 380 of FIG. 11.

In this way, the process is completed.

In the present embodiment, the parity calculation process is performed in the flash drive, so that it is possible to reduce a load of the processor 14 of the storage controller 12. In addition, similarly to the Embodiment 1, since the new parity generation process is performed according to a response to the host 10, it is possible to reduce an overhead such as finding new data from which new parity needs to be generated when the new parity is generated asynchronously with a write request and to suppress a load of the processor 498 of the flash drive, so that the number of requests from the host processible per unit time is increased and it is possible to increase the speed of the storage system.

Description of Terms

In the above description, information expressed by "XXX table" has been described; however, information may be expressed in any data structure. That is, in order to indicate that information does not depend on a data structure, the "XXX table" can be called "XXX information". Furthermore, in the following description, and each table is an example of a configuration, one table may be divided into two or more tables or the whole or a part of two or more tables may be one table.

Furthermore, in the above description, as IDs (identification information) of various objects, a number is used; however, instead of the number or in addition to the number, another type of identification information may be used.

Furthermore, in the above description, the "drive" indicates a physical storage device and typically, may be a nonvolatile storage device (for example, an auxiliary storage device), or the drive, for example, may be an SSD or a HDD.

Furthermore, in the above description, the "RAID" is an abbreviation for Redundant Array of Independent (or Inexpensive) Disks. A RAID group is configured with a plurality of drives and stores data according to an RAID level associated with the RAID group. The RAID group may be called a parity group. The parity group, for example, may be a RAID group for storing parity.

Furthermore, in the above description, the "LDEV" is an abbreviation for Logical Device. The "LDEV" indicates a logical device configured using a storage area (for example, a RAID group (or a parity group)) provided by controlling the drive by a control method of the RAID and the like, and the drive provides a storage area using the LDEV as a unit.

Furthermore, in the above description, there is a case where a process is described using the "program" as a subject; however, when the program is executed by a processor (for example, a central processing unit (CPU)), since a prescribed process is properly performed using a storage unit (for example, a memory) and/or an interface device (for example, a communication port), the subject of the process may be the processor. A process described using the program as a subject may be a process performed by the processor, or a device or a system included in the processor. Furthermore, the processor may include a hardware circuit that performs a part or the whole of the process. The program may be installed in a device such as a computer from a program source. The program source, for example, may be storage media readable by a program distribution server or a computer. When the program source is the program distribution server, the program distribution server may include a processor (for example, a CPU) and a storage unit, wherein the storage unit may further store a distribution program and a program to be distributed. A processor of the program distribution server may execute the distribution program, thereby distributing the program to be distributed to other computers. Furthermore, in the following description, two or more programs may be expressed as one program or one program may be expressed as two or more programs.

Furthermore, in the above description, the "host system" is a system that transmits an I/O (Input/Output) request to the storage system, and may include an interface device, a storage unit (for example, a memory), and a processor connected to the interface device and the storage unit. The host system may be configured with one or more host computers. At least one host computer may be a physical computer and the host system may include a virtual host computer in addition to the physical host computer. Furthermore, when the server and the storage system are formed integrally with each other, one of virtual machines in the server may be configured to transmit the I/O request.

Furthermore, in the above description, the "storage system" may be one or more storage devices and may include a plurality of drives (for example, one or more RAID groups) and a storage controller that controls an I/O for the plurality of drives. The storage controller may include a backend interface device (BE I/F) connected to the plurality of drives, a frontend interface device (FE I/F) connected to at least one of the host system and the management system, a storage unit, and a processor connected to these elements. The storage controller may be redundant.

Furthermore, in the above description, the "VOL" is an abbreviation for logical volume and may be a logical storage device.

So far, although some embodiments have been described, it goes without saying that the present invention is not limited to the embodiments and various modifications can be made without departing from the scope of the present invention.

REFERENCE SIGNS LIST

10: host, 42: storage system, 12: storage controller, 14: processor, 18: memory, 24: program area, 20: buffer area, 22: cache area, 26: drive, 28: drive group, 30: management table area, 32: buffer area management table, 34: cache memory area management table, 35: cache directory management table, 36: LDEV page management, 38: JOB # management, 52: FE I/F, 54: BE I/F, 56: SW, 100: new data, 102: old data, 104: old parity, 106: new parity

The invention claimed is:

1. An information processing system including a processor and a memory and performing data input/output with respect to a storage device, wherein the memory includes a buffer area and a cache area, the processor is configured to perform a write process, the write process includes storing new data associated with a received write request in the memory, reading old data updated by the new data and an old parity according to the old data from the storage device, storing the old data and the old parity in the memory, generating, based on the new data, the old data, and the old parity, a new parity according to the new data, storing the new parity in the memory, and storing the new data and the new parity in the storage device, wherein the processor is further configured to perform a first write process where the new data is to be stored in the buffer area or a second write process where the new data is to be stored in the cache area, and when receiving a read request of the new data while the first write process is in progress, the processor performs the second write process instead of the first write process, and transmits, to a request source of the received read request, new data stored in the cache area in the performed second write process.

2. The information processing system according to claim 1, wherein when receiving the write request of the new data and performing the first write process, the processor ensures storage areas for storing the new data, the old data, the old parity, and the new parity in the memory, and receives the new data after ensuring the storage areas.

3. The information processing system according to claim 1, wherein the processor further stores the new parity in the buffer area in the first write process.

4. The information processing system according to claim 1, wherein in the first write process, the processor further stores the new data and the new parity in the storage device and deletes the old data and the old parity stored in the buffer area from the buffer area.

5. The information processing system according to claim 1, wherein the processor stores the new data and the new parity in the cache area in second write process.

6. The information processing system according to claim 1, wherein when storing the new data in the cache area in the second write process, the processor transmits a response to a request source of the write request, and generates the new parity after transmitting the response.

7. The information processing system according to claim 1, wherein when storing the new data in the cache area in the second write process, the processor a response transmits to a request source of the write request, and generates the new parity asynchronously with transmitting the response.

8. The information processing system according to claim 1, wherein the storage device includes a first storage device in which data is stored and a second storage device in which a parity is stored, the first storage device reads the old data and stores the new data, and the second storage device reads the old parity and stores the new parity.

9. An information processing method for an information processing system including a processor and a memory in which data input/output are performed with respect to a storage device, wherein the memory includes a buffer area and a cache area, the information processing method includes storing new data associated with a received write request in the memory, reading old data updated by the new data and an old parity according to the old data from the storage device, storing the old data and the old parity in the memory, generating, based on the new data, the old data, and the old parity, a new parity according to the new data, storing the new parity in the memory, storing the new data and the new parity in the storage device, wherein the information processing method further includes a first write process where the new data is to be stored in the buffer area or a second write process where the new data is to be stored in the cache area, and when receiving a read request of the new data while the first write process is in progress, performing the second write process instead of the first write process, and transmitting, to a request source of the received read request, new data stored in the cache area in the performed second write process.

\* \* \* \* \*